US012373404B2

(12) United States Patent
Feghhi et al.

(10) Patent No.: US 12,373,404 B2
(45) Date of Patent: Jul. 29, 2025

(54) SCHEMA MATCHING OF DISPARATE DATA SOURCES USING EMBEDDING-BASED SIMILARITY SCORES

(71) Applicant: Optum Services (Ireland) Limited, Dublin (IE)

(72) Inventors: Saman Feghhi, Dublin (IE); Riccardo Mattivi, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 18/462,239

(22) Filed: Sep. 6, 2023

(65) Prior Publication Data

US 2025/0077483 A1 Mar. 6, 2025

(51) Int. Cl.
*G06F 16/00* (2019.01)
*G06F 16/21* (2019.01)

(52) U.S. Cl.
CPC .................................. *G06F 16/213* (2019.01)

(58) Field of Classification Search
CPC .................................................... G06F 16/213
See application file for complete search history.

(56) References Cited

U.S. PATENT DOCUMENTS

| | | | |
|---|---|---|---|
| 9,418,085 B1 | 8/2016 | Shih et al. | |
| 11,526,523 B2 * | 12/2022 | Somani | G06F 16/355 |
| 11,960,484 B2 * | 4/2024 | Agrawal | G06F 16/221 |
| 2005/0050053 A1 | 3/2005 | Thompson | |
| 2006/0212860 A1 | 9/2006 | Benedikt et al. | |
| 2006/0259458 A1 | 11/2006 | Hunter et al. | |
| 2008/0313219 A1 | 12/2008 | Benfield et al. | |
| 2013/0091184 A1 | 4/2013 | Alexe et al. | |
| 2017/0206256 A1 | 7/2017 | Tsirogiannis et al. | |
| 2020/0097504 A1 | 3/2020 | Sequeda et al. | |
| 2021/0232908 A1 | 7/2021 | Xian et al. | |
| 2021/0334250 A1 | 10/2021 | Desmarets | |
| 2022/0050813 A1 * | 2/2022 | Fridman | G06F 16/213 |
| 2022/0100714 A1 | 3/2022 | Zhao et al. | |

OTHER PUBLICATIONS

Efthymiou, et al., “Matching Web Tables with Knowledge Base Entities: From Entity Lookups to Entity Embeddings,” (16 pages), Retrieved on Feb. 27, 2023 from https://iswc2017.ai.wu.ac.at/wpcontent/uploads/papers/MainProceedings/98.pdf.
Gao, et al., Medical Schema Matching using Knowledge Graph Embedding.
Hattasch, et al., “It's AI Match: A Two Step Approach for Schema Matching Using Embeddings”, Mar. 8, 2022, (13 pages), arXiv:2203.04366v1.
Koutras, et al., “Valentine: Evaluating Matching Techniques for Dataset Discovery”, Feb. 13, 2021, (12 pages), arXiv:2010.07386v2.
Portisch, et al., “Background Knowledge in Schema Matching: Strategy vs. Data”, Jun. 29, 2021, (17 pages), arXiv:2107.00001v1.
(Continued)

*Primary Examiner* — Leslie Wong
(74) *Attorney, Agent, or Firm* — ALSTON & BIRD LLP

(57) ABSTRACT

Embodiments provide for schema matching between multiple disparate data sources using multi-dimensional matrices, external embeddings, transformation operations, and similarity metrics.

20 Claims, 23 Drawing Sheets

(56) References Cited

OTHER PUBLICATIONS

Rahm, "A Survey of Approaches to Automatic Schema Matching", The VLDB Journal, Dec. 2001, (18 pages), DOI: 10.1007/s007780100057.
Rodrigues, et al., "A Study on Machine Learning Techniques for the Schema Matching Network Problem", Journal of the Brazilian Computer Society, vol. 27:14, (2021), 29 pages, doi.org/10.1186/s13173-021-00119-5.
Sahay, et al., "Schema Matching using Machine Learning", Nov. 24, 2019, (7 pages), arXiv:1911.11543v1.
Venkatesh, "Automatic Schema Detection and Matching", Mar. 5, 2020, (5 pages), Retrieved from https://dbadminnews.substack.com/p/automatic-schema-detection-and-matching.
Wikipedia, "Schema Matching", (4 pages), Retrieved from the Internet on Jun. 10, 2024, https://en.wikipedia.org/wiki/Schema_matching.
Zhang, et al., "Novel Entity Discovery from Web Tables," Feb. 1, 2020, (11 pages), arXiv:2002.00206v1.

* cited by examiner

| Type of Approach | Description | | Matching Approach | | Technique | Accuracy | Domain | | Handle semantic |
|---|---|---|---|---|---|---|---|---|---|
| | | | Schema | Content | | | General | Medical | |
| Constraint-based | Key properties, or type similarities (e.g. DOUBLE) | | **Yes** | *No* | Classical | *Low* | **Yes** | *No* | *No* |
| Linguistic | Name or description similarity (e.g. Levensthein) | | **Yes** | *No* | Classical | *Low* | **Yes** | *No* | *No* |
| Constraint-based | Value pattern and ranges (statistical properties of data) | | *No* | **Yes** | Classical | **Medium** | **Yes** | *No* | *No* |
| Linguistic | Information retrieval, word frequencies, BoW, tf-Idf, WordNet | | *No* | **Yes** | Classical | **Medium** | **Yes** | *No* | **No/Limited** |
| Schema & Content approaches | A combination of the above | | **Yes** | **Yes** | Classical | **Medium** | **Yes** | *No* | **No/Limited** |
| Modern Linguistic via Embeddings | NLP embeddings | | *No* | **Yes** | ***Modern Neural Networks*** | **Medium/ High** | **Yes** | *No* | **Yes** |
| Modern Linguistic via Knowledge Graphs | Graph & NLP embeddings | | *No* | **Yes** | ***Modern Neural Networks*** | **Medium/ High** | *No* | **Yes** | **Yes** |

| Handles type of mismatches | | | Use of External Knowledge | Knowledge discovery | Distributed | Application | | |
|---|---|---|---|---|---|---|---|---|
| Different order | Absence/Presence | Hierarchies | | | Computation | Scale DBs | Use case | Example |
| *No* | *No* | *No* | *No* | *No* | *No* | *Small* | Few tables, small-sized company | Team |
| *No* | *No* | *No* | *No* | *No* | *No* | *Small* | Few tables, small-sized company | Team |
| *No* | *No* | *No* | *No* | *No* | *No* | **Medium** | **Dozens of tables, medium-sized company** | **Different Teams** |
| *No* | *No* | *No* | **Yes** ***(WordNet)*** | *No* | *No* | **Medium** | **Dozens of tables, medium-sized company** | **Different Teams** |
| **No/Yes** | **No/Yes** | *No* | *No* | *No* | *No* | **Medium** | **Dozens of tables, medium-sized company** | **Different Teams** |
| ***Yes*** | ***Yes*** | *No* | *No* | *No* | *No* | ***Large*** | **Thousands of tables, big-sized company** | **Company wide** |
| ***Yes*** | ***Yes*** | *No* | **Yes** ***(Wikipedia)*** | *No* | *No* | ***Large*** | **Thousands of tables, big-sized company** | **Company wide** |

FROM FIG. 5A

601 — Generate, based at least in part on a first data structure and a first external embeddings data structure, a first embeddings set

602 — Generate, based at least in part on a second data structure and a second external embeddings data structure, a second embeddings set

603 — Transform, based at least in part on a first transformation operation, the first embeddings set into a first embeddings data structure, and the second embeddings set into a second embeddings data structure

604 — Transform, based at least in part on a second transformation operation, the first embeddings data structure into a first embeddings representation vector and the second embeddings data structure into a second embeddings representation vector

605 — Based at least in part on a similarity metric generated based at least in part on the first embeddings representation vector and the second embeddings representation vector, generate an similarity indication element associated with the first data structure and the second data structure

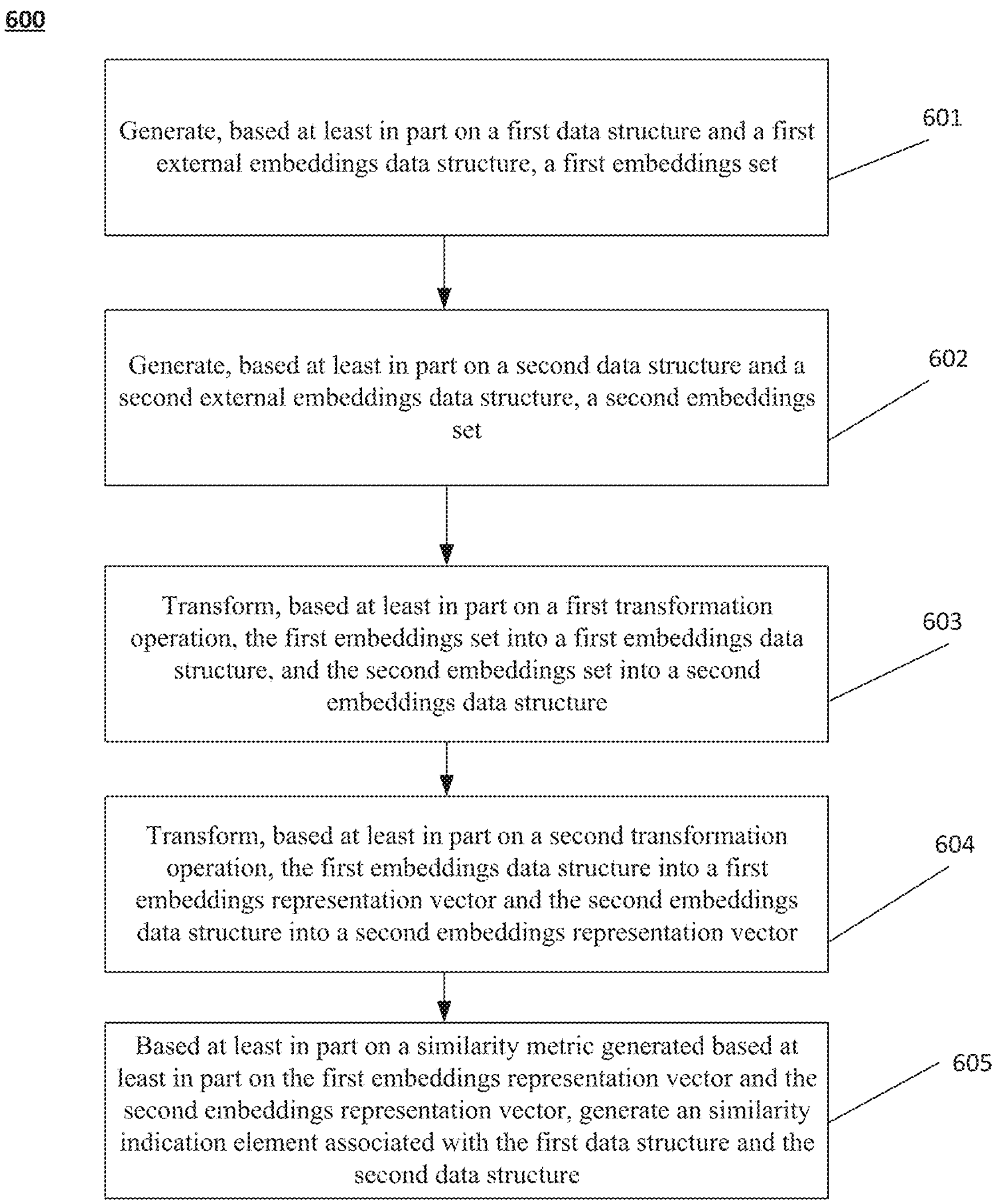

┌─────────────────────────────────────────────┐
│ Generate, based at least in part on a first data structure and
│ plurality of external embeddings data structures, a plurality of
│ external embeddings sets, the plurality of external embeddings — 621
│ sets each comprising an embedding entry for each record of the
│ first data structure for each of the plurality of external
│ embeddings data structures
└─────────────────────────────────────────────┘
                          ▼
┌─────────────────────────────────────────────┐
│ Transform, based at least in part on a first transformation
│ operation, each of the plurality of external embeddings sets into a — 622
│ respective embeddings data structure of a plurality of
│ embeddings data structures
└─────────────────────────────────────────────┘
                          ▼
┌─────────────────────────────────────────────┐
│ Transform, based at least in part on a second transformation
│ operation, the plurality of embeddings data structures into a — 623
│ plurality of embeddings representation vectors
└─────────────────────────────────────────────┘
                          ▼
┌─────────────────────────────────────────────┐
│ Transform, based at least in part on the second transformation
│ operation, the plurality of external embeddings data structures — 624
│ into a plurality of embeddings representation structures
└─────────────────────────────────────────────┘
                          ▼
┌─────────────────────────────────────────────┐
│ Based at least in part on one or more similarity metrics generated
│ based at least in part on one or more of the plurality of
│ embeddings representation vectors and one or more of the — 625
│ plurality of embeddings representation structures, generate a
│ schema type element associated with the first data structure
└─────────────────────────────────────────────┘

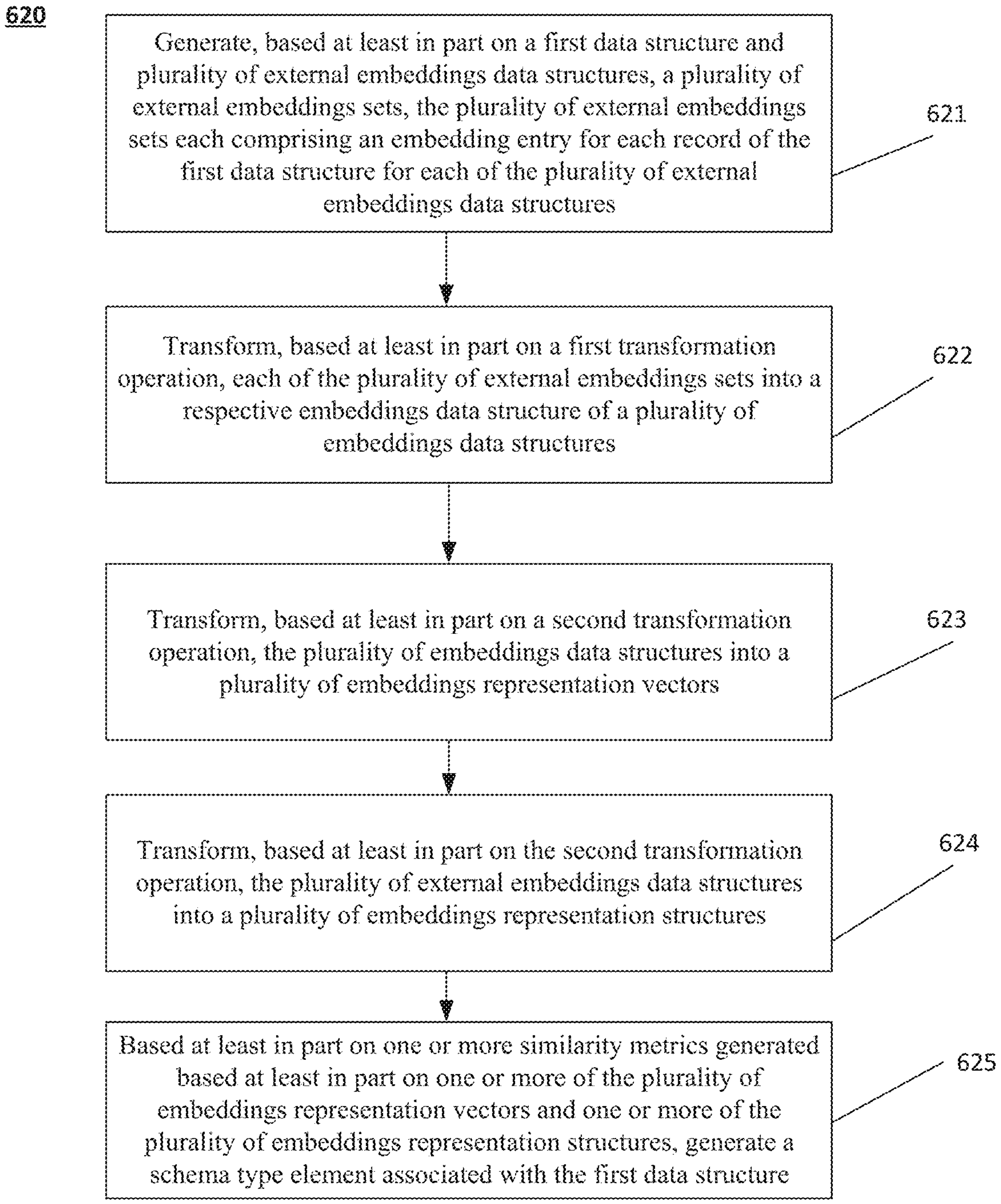

FIG. 6B

Table A (700)

| TableA: col 1 | TableA: col N |
|---|---|
| [dx123, dx456, dx678] | ... |
| [dx123, dx45, dx678] | ... |
| [dx123, dx456, dx678] | ... |

701A, 702A, 703A

Table Z (710)

| TableZ: icd10 | TableZ: col Z |
|---|---|
| [dx456, dx678, dx123] | ... |
| [dx456, dx678, dx123] | ... |
| [dx123, dx678] | ... |

Table A (700)

| TableA: col 1 |
|---|
| [dx123, dx456, dx678] |
| [dx123, dx45, dx678] |
| [dx123, **dx456**, dx678] |
| ... |

701A, 702A, 703A

| Type of Mismatch |
|---|
| Different order |
| Different order & one level up in hierarchy |
| Missing value |
| Etc... |

Table Z (710)

| TableZ: icd10 |
|---|
| [dx456, dx678, dx123] |
| [dx456, dx678, dx123] |
| [dx123, dx678] |
| ... |

700 800

| TableA: col1 | Looked up embeddings from col1 |
|---|---|
| [dx123, dx456, dx678] | ([0.11, 0.15, ..., 0.40]<br>+ [0.42, 0.99, ..., 0.21]<br>+ [1.00, 1.00, ..., 0.34]) |
| [dx123, *dx45*, dx678] | ([0.11, 0.15, ..., 0.40]<br>+ [0.40 , 0.89, ..., 0.21]<br>+ [1.00, 1.00, ..., 0.34]) |
| [dx123, **dx456**, dx678] | ([0.11, 0.15, ..., 0.40]<br>+ [0.42, 0.99, ..., 0.21]<br>+ [1.00, 1.00, ..., 0.34]) |
| ... | |

710 810

| TableZ: icd10 | Looked up embeddings from icd10 |
|---|---|
| [dx456, dx678, dx123] | ([0.42, 0.99, ..., 0.21]<br>+ [1.00, 1.00, ..., 0.34]<br>+ [0.11, 0.15, ..., 0.40]) |
| [*dx456*, dx678, dx123] | ([0.42, 0.99, ..., 0.21]<br>+ [1.00, 1.00, ..., 0.34]<br>+ [0.11, 0.15, ..., 0.40]) |
| [dx123, dx678] | ([0.11, 0.15, ..., 0.40]<br>+ [1.00, 1.00, ..., 0.34]) |
| ... | |

FIG. 8B 700 820

| TableA: col1 | Mean of looked up embeddings from col1 |
|---|---|
| [dx123, dx456, dx678] | ([0.11, 0.15, ..., 0.40]<br>+ [0.42, 0.99, ..., 0.21]<br>+ [1.00, 1.00, ..., 0.34])<br>/ 3 |
| [dx123, *dx45*, dx678] | ([0.11, 0.15, ..., 0.40]<br>+ [0.40, 0.89, ..., 0.21]<br>+ [1.00, 1.00, ..., 0.34])<br>/ 3 |
| [dx123, **dx456**, dx678] | ([0.11, 0.15, ..., 0.40]<br>+ [0.42, 0.99, ..., 0.21]<br>+ [1.00, 1.00, ..., 0.34])<br>/ 3 |
| ... | |

710 830

| TableZ: icd10 | Mean of looked up embeddings from icd10 |
|---|---|
| [dx456, dx678, dx123] | ([0.42, 0.99, ..., 0.21]<br>+ [1.00, 1.00, ..., 0.34]<br>+ [0.11, 0.15, ..., 0.40])<br>/ 3 |
| [*dx456*, dx678, dx123] | ([0.42, 0.99, ..., 0.21]<br>+ [1.00, 1.00, ..., 0.34]<br>+ [0.11, 0.15, ..., 0.40])<br>/ 3 |
| [dx123, dx678] | ([0.11, 0.15, ..., 0.40]<br>+ [1.00, 1.00, ..., 0.34])<br>/ 2 |
| ... | |

FIG. 8C 700 840

| TableA: col1 | Mean of looked-up embeddings from col1 |
|---|---|
| [dx123, dx456, dx678] | [0.51, 0.71, ..., 0.32] |
| [dx123, *dx45*, dx678] | [0.50, 0.68, ..., 0.32] |
| [dx123, **dx456**, dx678] | [0.51, 0.71, ..., 0.32] |
| ... | |

710 850

| TableZ: icd10 | Mean of looked-up embeddings from icd10 |
|---|---|
| [dx456, dx678, dx123] | [0.51, 0.71, ..., 0.32] |
| [*dx456*, dx678, dx123] | [0.51, 0.71, ..., 0.32] |
| [dx123, dx678] | [0.55, 0.57, ..., 0.37] |
| ... | |

FIG. 8D 700 840

| TableA: col1 | Mean of looked-up embeddings from col1 |
|---|---|
| [dx123, dx456, dx678] | [0.51, 0.71, ..., 0.32] |
| [dx123, *dx45*, dx678] | [0.50, 0.68, ..., 0.32] |
| [dx123, **dx456**, dx678] | [0.51, 0.71, ..., 0.32] |
| ... | |

860 → [0.51, 0.70, ..., 0.32]

710 850

| TableZ: icd10 | Mean of looked-up embeddings from icd10 |
|---|---|
| [dx456, dx678, dx123] | [0.51, 0.71, ..., 0.32] |
| [*dx456*, dx678, dx123] | [0.51, 0.71, ..., 0.32] |
| [dx123, dx678] | [0.55, 0.57, ..., 0.37] |
| ... | |

| TableA: col1 | Looked up embeddings from UMLS | Looked up embeddings from Facility | Looked up embeddings from Etc Etc |
|---|---|---|---|
| [dx123, dx456, dx678] | ([0.11, 0.15, ..., 0.40] + [0.42, 0.99, ..., 0.21] + [1.00, 1.00, ..., 0.34]) | Numerical values | Numerical values |
| [dx123, *dx45*, dx678] | ([0.11, 0.15, ..., 0.40] + [0.40, 0.89, ..., 0.21] + [1.00, 1.00, ..., 0.34]) | Numerical values | Numerical values |
| [dx123, **dx456**, dx678] | ([0.11, 0.15, ..., 0.40] + [0.42, 0.99, ..., 0.21] + [1.00, 1.00, ..., 0.34]) | Numerical values | Numerical values |
| ... | ... | ... | ... |

FIG. 9B 910 925 935 945

| TableA: col1 | Looked up embeddings from UMLS | Looked up embeddings from Facility | Looked up embeddings from Etc Etc |
|---|---|---|---|
| [dx123, dx456, dx678] | [0.51, 0.71, ..., 0.32] | Numerical values | Numerical values |
| [dx123, *dx45*, dx678] | [0.50, 0.68, ..., 0.32] | Numerical values | Numerical values |
| [dx123, **dx456**, dx678] | [0.51, 0.71, ..., 0.32] | Numerical values | Numerical values |
| ... | ... | ... | ... |

| TableA: col1 | Looked up embeddings from UMLS | Looked up embeddings from Facility | Looked up embeddings from Etc Etc |
|---|---|---|---|
| [dx123, dx456, dx678] | [0.51, 0.71, ..., 0.32] | Numerical values | Numerical values |
| [dx123, *dx45*, dx678] | [0.50, 0.68, ..., 0.32] | Numerical values | Numerical values |
| [dx123, **dx456**, dx678] | [0.51, 0.71, ..., 0.32] | Numerical values | Numerical values |
| ... | ... | ... | ... |

1201 1212 1222 1232

| TableA: col1 | Looked up embeddings from UMLS | Looked up embeddings from Hospital | Looked up embeddings from Professional |
|---|---|---|---|
| [dx123, dx456, dx678] | [0.51, 0.71, ..., 0.32] | Numerical values | Numerical values |
| [dx123, dx45, dx678] | [0.50, 0.68, ..., 0.32] | Numerical values | Numerical values |
| [dx123, dx456, dx678] | [0.51, 0.71, ..., 0.32] | Numerical values | Numerical values |
| ... | ... | ... | ... |

| | UMLS table | PROF table | HOPS table |
|---|---|---|---|
| Looked-up from UMLS | -0.48 | -0.12 | 0.13 |
| Looked-up from PROF | 0.03 | 0.63 | -0.25 |
| Looked-up from HOSP | -0.02 | -0.11 | 0.64 |

SCHEMA MATCHING OF DISPARATE DATA SOURCES USING EMBEDDING-BASED SIMILARITY SCORES

BACKGROUND

Data analytics tasks require sourcing information from multiple sources. Depending on infrastructure, technologies, and how the data is collected and stored in each of these sources, data can have different schemas. As a result, when combining data, similar fields across datasets cannot be identified by basic methods (e.g., merely selecting or looking at fields with similar names). Indeed, columns with similar names can and often do store data with diverse meanings. Moreover, the manual approach to look into fields across multiple datasets is time consuming and requires specific domain expertise.

Through applied effort, ingenuity, and innovation, many of these identified deficiencies and problems have been solved by developing solutions that are structured in accordance with embodiments of the present disclosure, many examples of which are described in detail herein.

BRIEF SUMMARY

Embodiments provide for schema matching between multiple disparate data sources using multi-dimensional matrices, external embeddings, transformation operations, and similarity metrics.

An example system is configured to generate, based on a first data structure and a first external embeddings data structure, a first embeddings set, the first embeddings set comprising an embedding entry for each record of the first data structure. The example system is further configured to generate, based on a second data structure and a second external embeddings data structure, a second embeddings set, the second embeddings set comprising an embedding entry for each record of the second data structure. The example system is further configured to transform, based on a first transformation operation, the first embeddings set into a first embeddings data structure, and to transform based on the first transformation operation, the second embeddings set into a second embeddings data structure. The example system is further configured to transform, based on a second transformation operation, the first embeddings data structure into a first embeddings representation vector, and to transform, based on the second transformation operation, the second embeddings data structure into a second embeddings representation vector. The example system is further configured to, generate a similarity metric based on the first embeddings representation vector and the second embeddings representation vector. The example system is further configured to, based on the similarity metric, generate a similarity indication element associated with the first data structure and the second data structure.

An example non-transitory computer-readable includes instructions that, when executed by one or more processors, cause the one or more processors to generate, based on a first data structure and a first external embeddings data structure, a first embeddings set, the first embeddings set comprising a first respective embedding entry for each first record of the first data structure; generate, based on a second data structure and a second external embeddings data structure, a second embeddings set, the second embeddings set comprising a second respective embedding entry for each second record of the second data structure; transform, based on a first transformation operation, the first embeddings set into a first embeddings data structure; transform, based on the first transformation operation, the second embeddings set into a second embeddings data structure; transform, based on a second transformation operation, the first embeddings data structure into a first embeddings representation vector; transform, based on the second transformation operation, the second embeddings data structure into a second embeddings representation vector; generate a similarity metric based on the first embeddings representation vector and the second embeddings representation vector; and based on the similarity metric, generate a similarity indication element associated with the first data structure and the second data structure.

An example computer-implemented method comprises generating, by one or more processors and based on a first data structure and a first external embeddings data structure, a first embeddings set, the first embeddings set comprising a first respective embedding entry for each first record of the first data structure; generating, by the one or more processors and based on a second data structure and a second external embeddings data structure, a second embeddings set, the second embeddings set comprising a second respective embedding entry for each second record of the second data structure; transforming, by the one or more processors and based on a first transformation operation, the first embeddings set into a first embeddings data structure; transforming, by the one or more processors and based on the first transformation operation, the second embeddings set into a second embeddings data structure; transforming, by the one or more processors and based on a second transformation operation, the first embeddings data structure into a first embeddings representation vector; transforming, by the one or more processors and based on the second transformation operation, the second embeddings data structure into a second embeddings representation vector; generating, by the one or more processors, a similarity metric based on the first embeddings representation vector and the second embeddings representation vector; and based on the similarity metric, generating, by the one or more processors, a similarity indication element associated with the first data structure and the second data structure.

Another example system is configured to generate, based on a first data structure and plurality of external embeddings data structures, a plurality of external embeddings sets, the plurality of external embeddings sets each comprising an embedding entry for each record of the first data structure for each of the plurality of external embeddings data structures. The example system is further configured to transform, based on a first transformation operation, each of the plurality of external embeddings sets into a respective embeddings data structure of a plurality of embeddings data structures. The example system is further configured to transform, based on a second transformation operation, the plurality of embeddings data structures into a plurality of embeddings representation vectors. The example system is further configured to transform, based on the second transformation operation, the plurality of external embeddings data structures into a plurality of embeddings representation structures. The example system is further configured to, based on one or more similarity metrics generated based on one or more of the plurality of embeddings representation vectors and one or more of the plurality of embeddings representation structures, generate a schema type element associated with the first data structure.

An example non-transitory computer-readable storage media includes instructions that, when executed by one or more processors, cause the one or more processors to generate, based on a first data structure and plurality of external embeddings data structures, a plurality of external embeddings sets, the plurality of external embeddings sets each comprising an embedding entry for each record of the first data structure for each of the plurality of external embeddings data structures; transform, based on a first transformation operation, each of the plurality of external embeddings sets into a respective embeddings data structure of a plurality of embeddings data structures; transform, based on a second transformation operation, the plurality of embeddings data structures into a plurality of embeddings representation vectors; transform, based on the second transformation operation, the plurality of external embeddings data structures into a plurality of embeddings representation structures; generate one or more similarity metrics based on one or more of the plurality of embeddings representation vectors and one or more of the plurality of embeddings representation structures; and based on the one or more similarity metrics, generate a schema type element associated with the first data structure.

An example computer-implemented method comprises generating, by one or more processors and based on a first data structure and plurality of external embeddings data structures, a plurality of external embeddings sets, the plurality of external embeddings sets each comprising an embedding entry for each record of the first data structure for each of the plurality of external embeddings data structures; transforming, by the one or more processors and based on a first transformation operation, each of the plurality of external embeddings sets into a respective embeddings data structure of a plurality of embeddings data structures; transforming, by the one or more processors and based on a second transformation operation, the plurality of embeddings data structures into a plurality of embeddings representation vectors; transforming, by the one or more processors and based on the second transformation operation, the plurality of external embeddings data structures into a plurality of embeddings representation structures; generating, by the one or more processors, one or more similarity metrics based on one or more of the plurality of embeddings representation vectors and one or more of the plurality of embeddings representation structures; and based on the one or more similarity metrics, generating, by the one or more processors, a schema type element associated with the first data structure.

The above summary is provided merely for purposes of summarizing some example embodiments to provide a basic understanding of some aspects of the present disclosure. Accordingly, it will be appreciated that the above-described embodiments are merely examples and should not be construed to narrow the scope or the spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
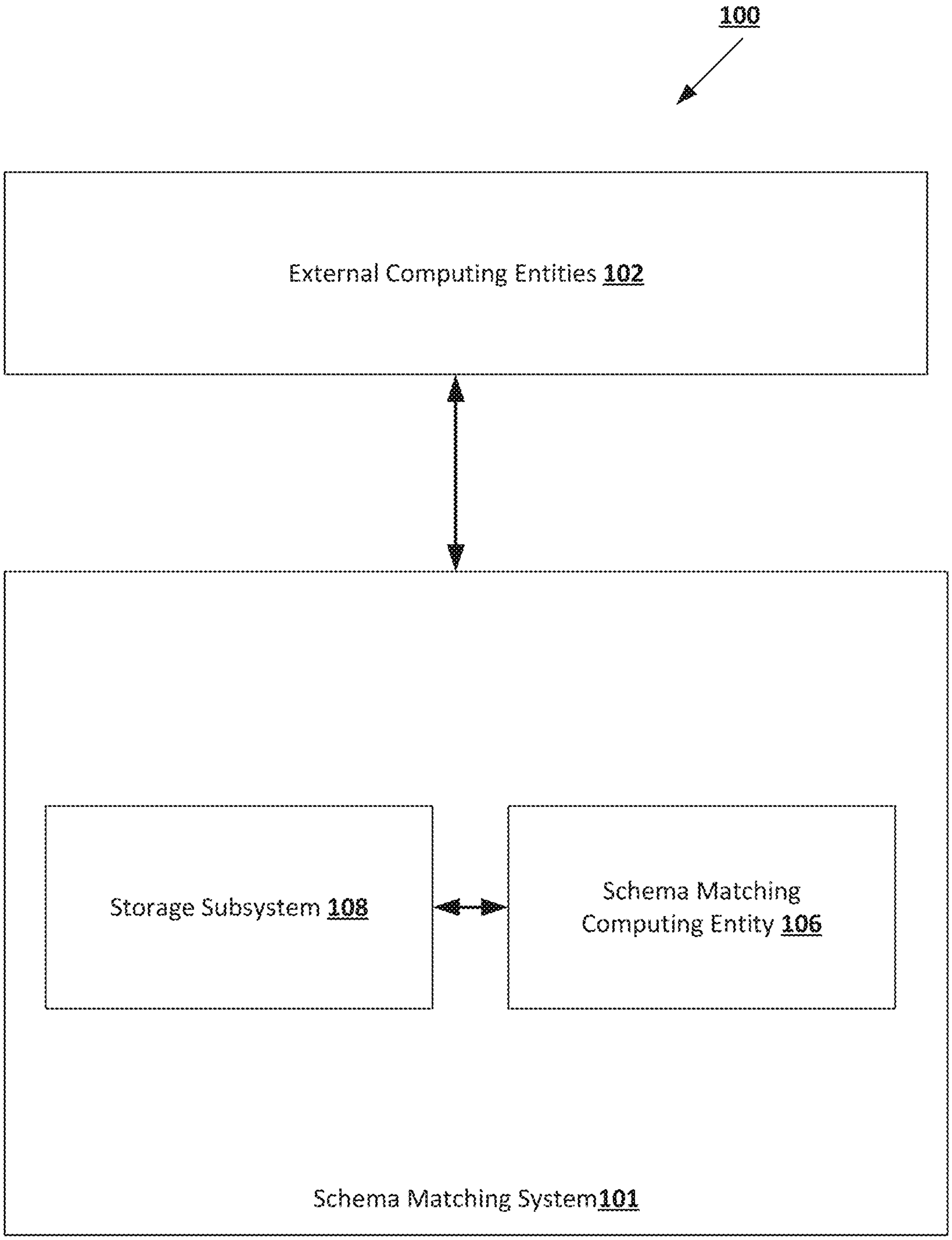

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings. Some embodiments may include the components arranged in a different way:

FIG. 1 provides an example overview of a system that can be used to practice embodiments of the present disclosure.

Figure 2:
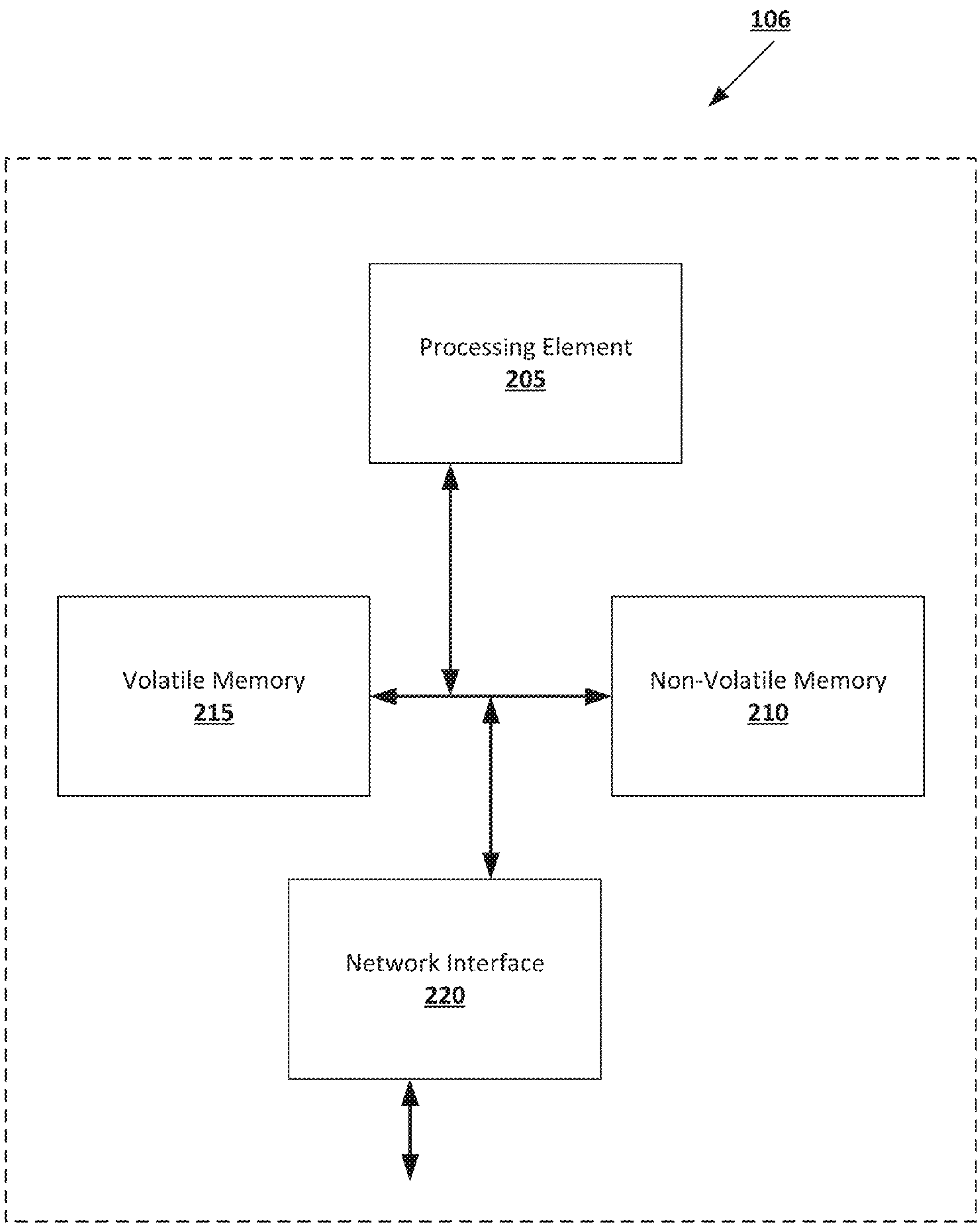

FIG. 2 provides an example schema matching computing entity in accordance with some embodiments discussed herein.

Figure 3:
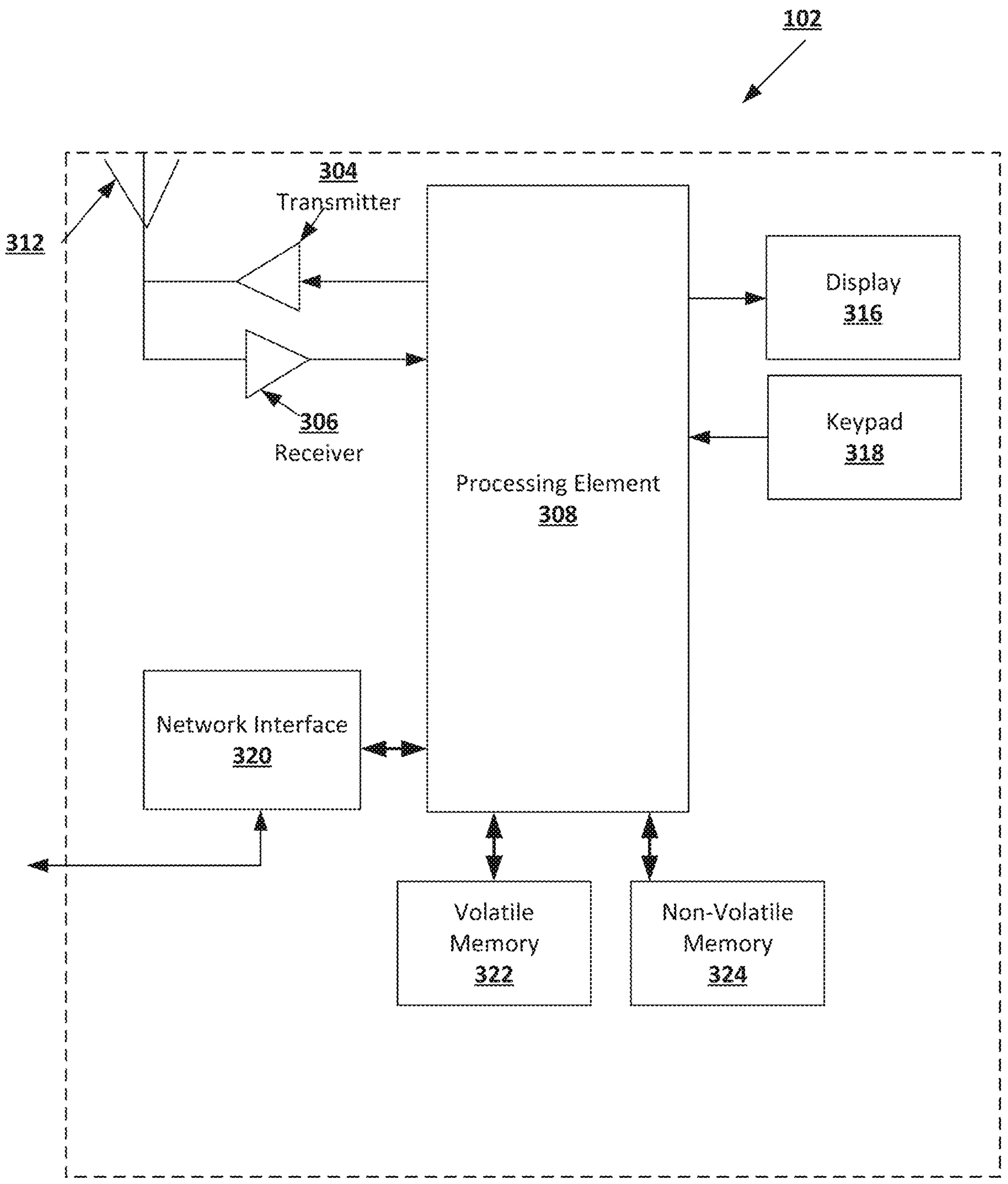

FIG. 3 provides an example external computing entity in accordance with some embodiments discussed herein.

Figure 4A:
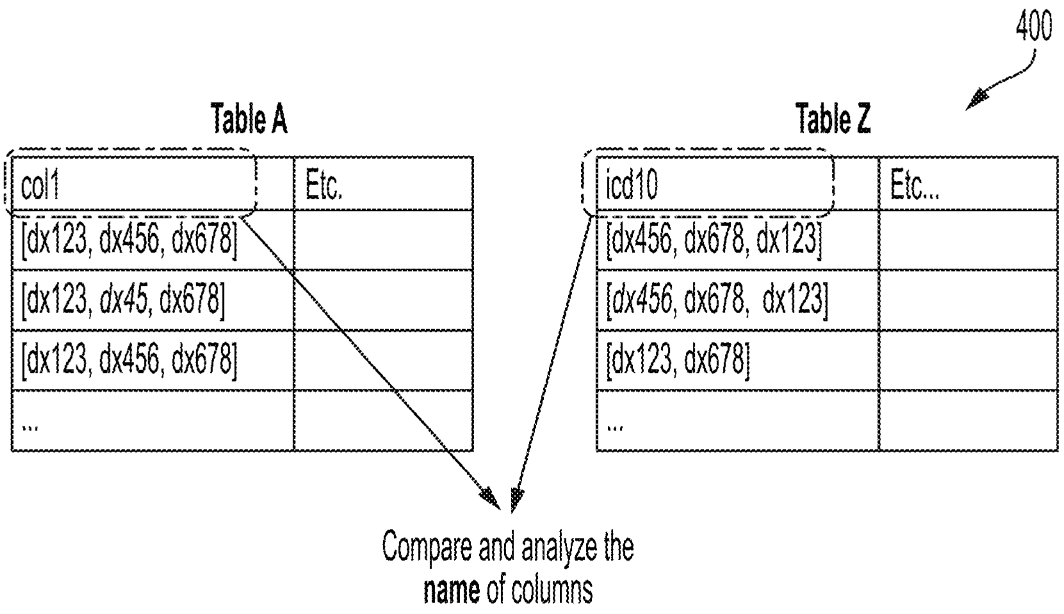
Figure 4B:
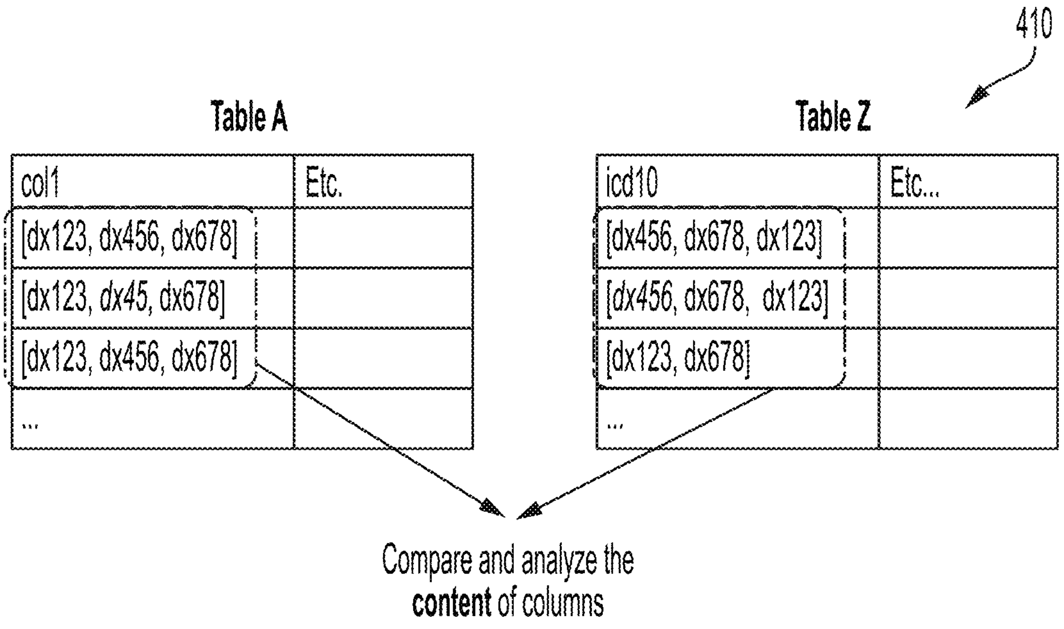

FIGS. 4A and 4B depict example schema matching approaches in accordance with some embodiments discussed herein.

FIGS. 5A and 5B depict comparisons of example schema matching approaches.

FIGS. 6A and 6B depict example operations for performance in accordance with some embodiments discussed herein.

Figure 7A:
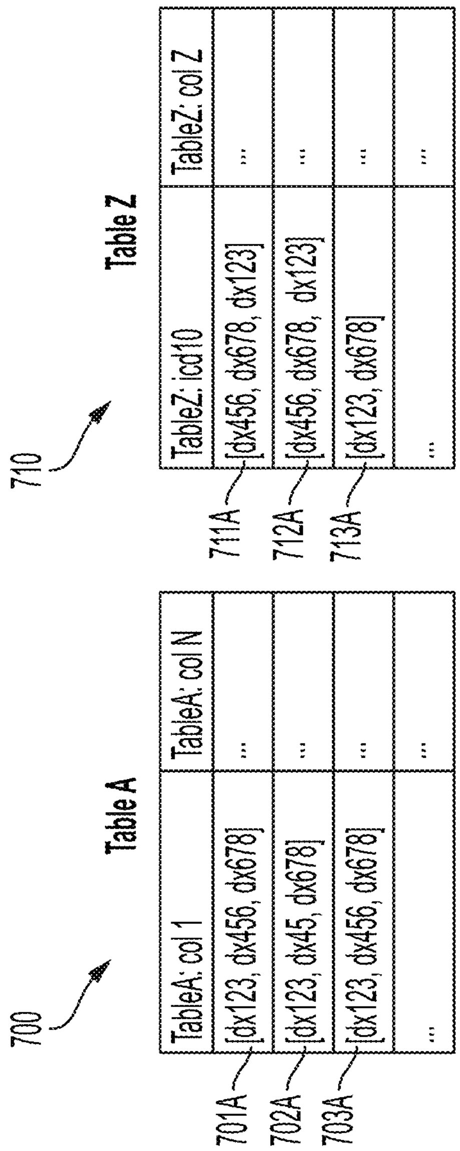
Figure 7B:
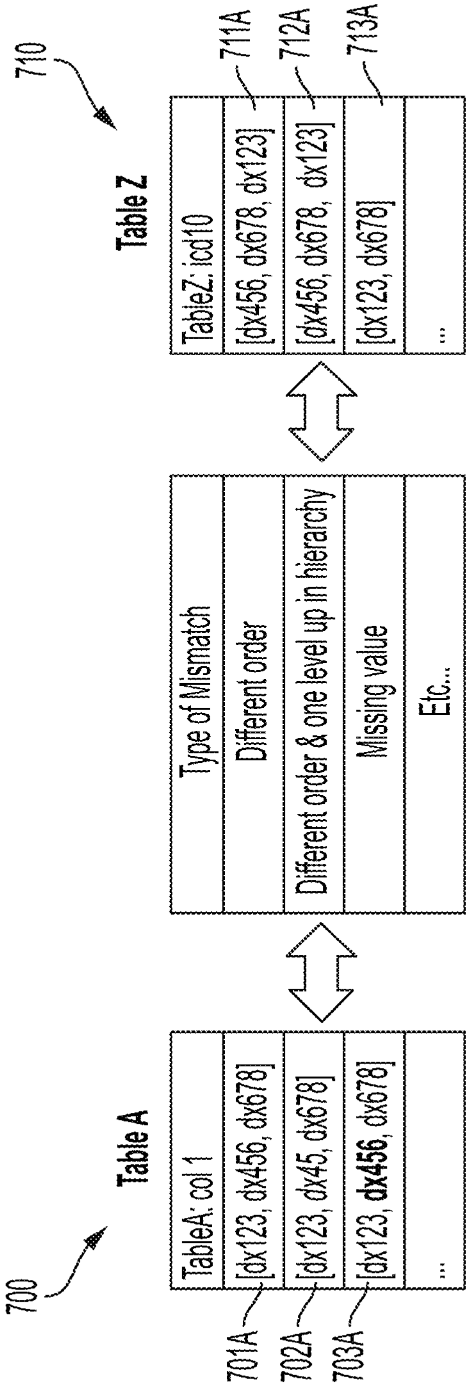

FIGS. 7A and 7B depict operational examples of matching operations for performance in accordance with some embodiments herein.

FIGS. 8A, 8B, 8C, 8D, 8E, and 8F depict operational examples of matching operations for performance in accordance with some embodiments herein.

Figure 9A:
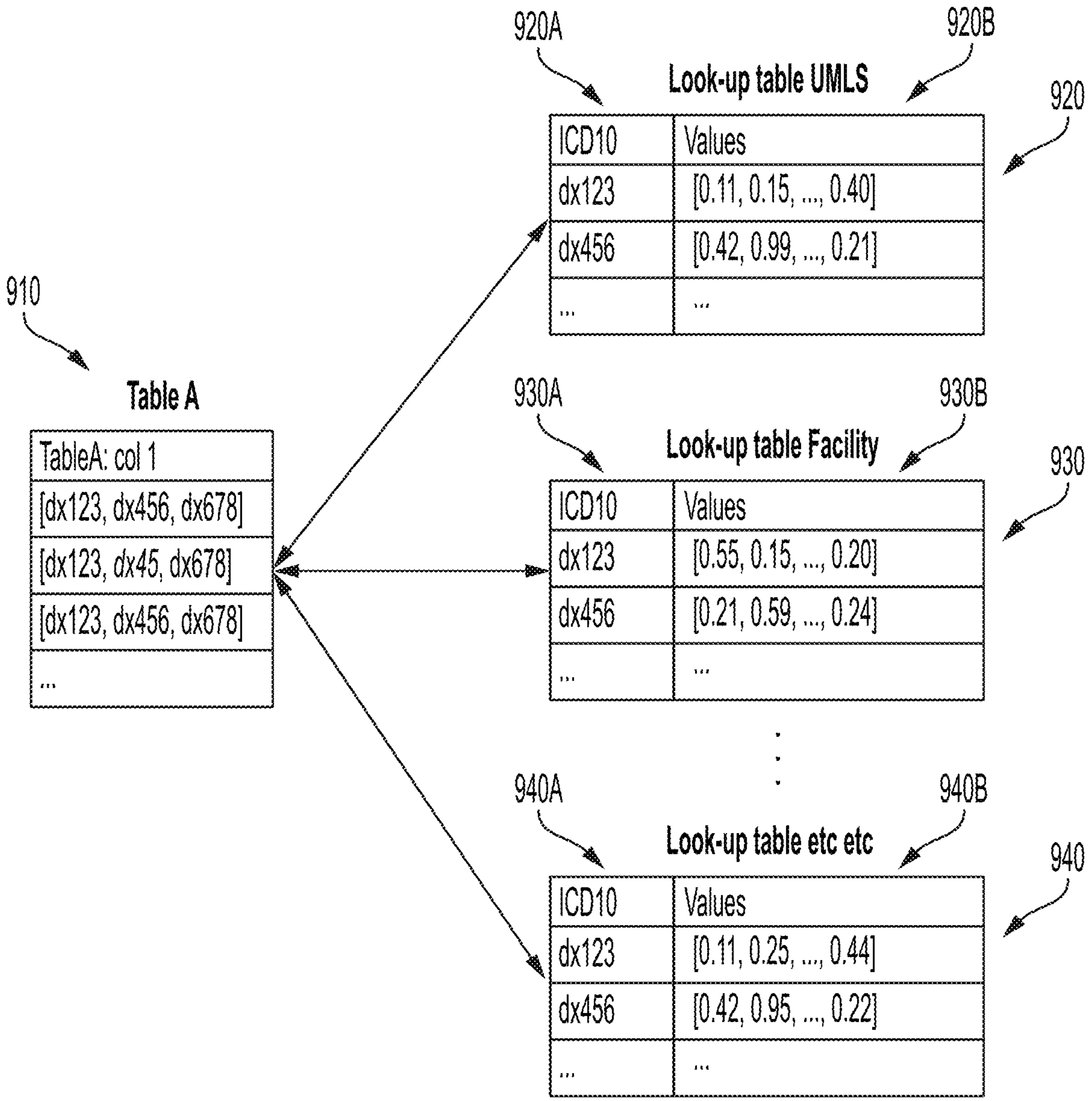

FIGS. 9A and 9B depict operational examples of matching operations for performance in accordance with some embodiments herein.

Figure 10B:
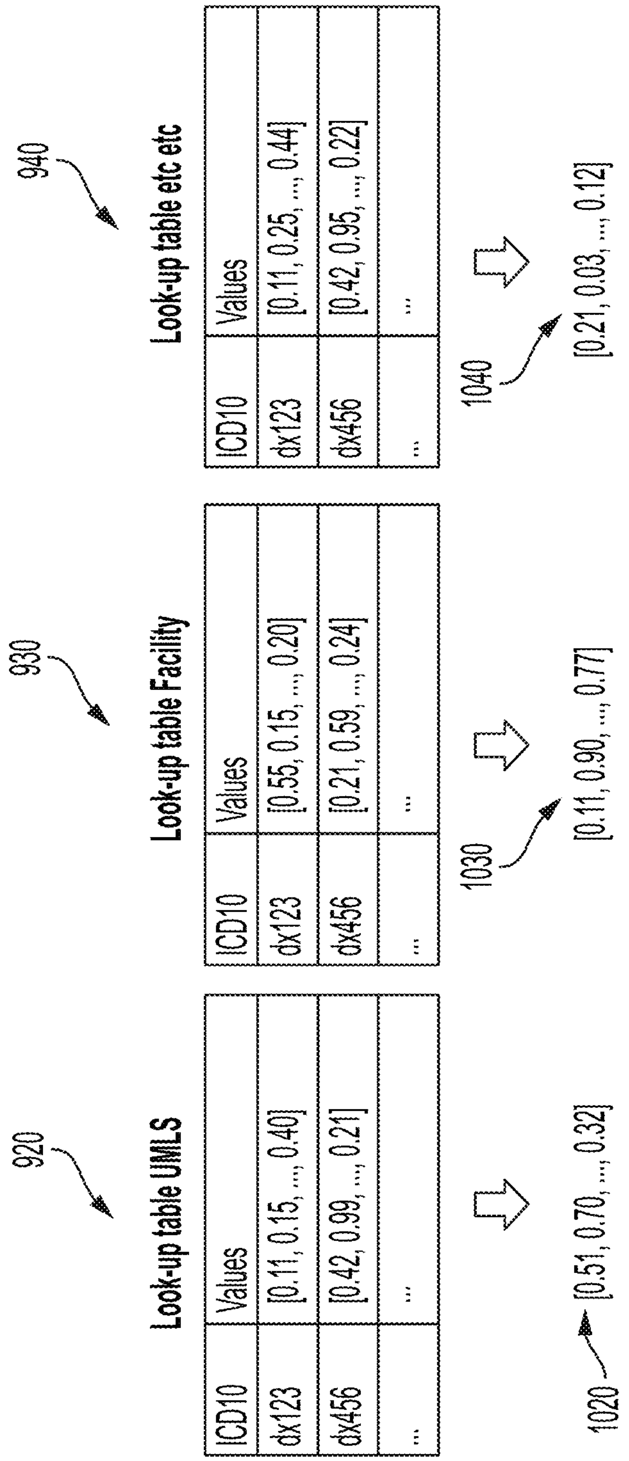
Figure 10C:
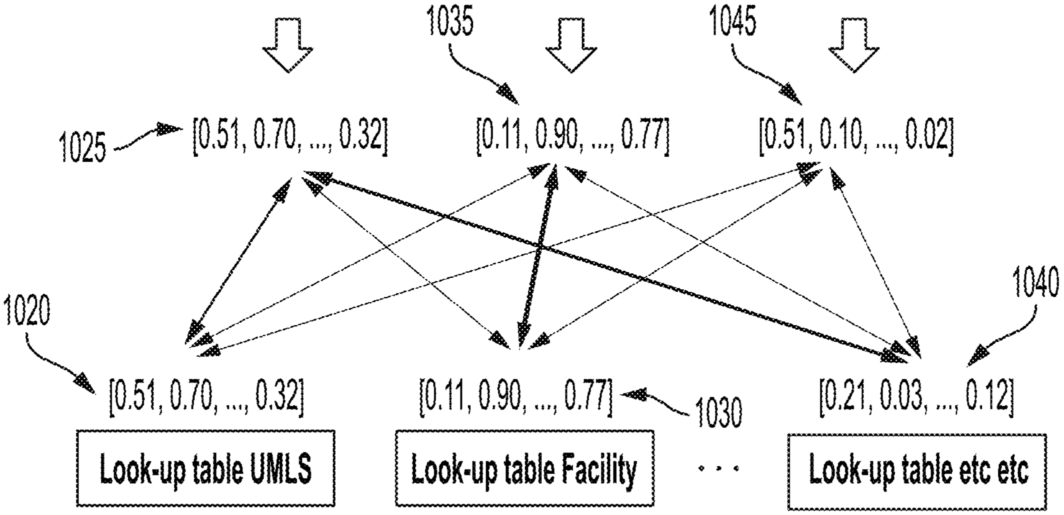

FIGS. 10A, 10B, and 10C depict operational examples of matching operations for performance in accordance with some embodiments herein.

Figure 11A:
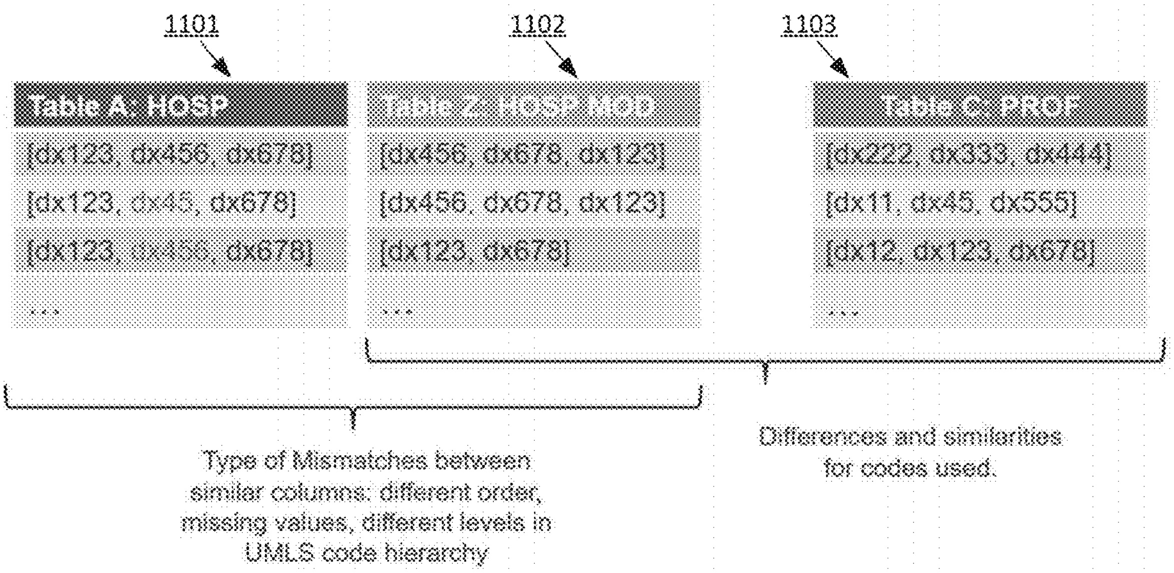
Figure 11B:
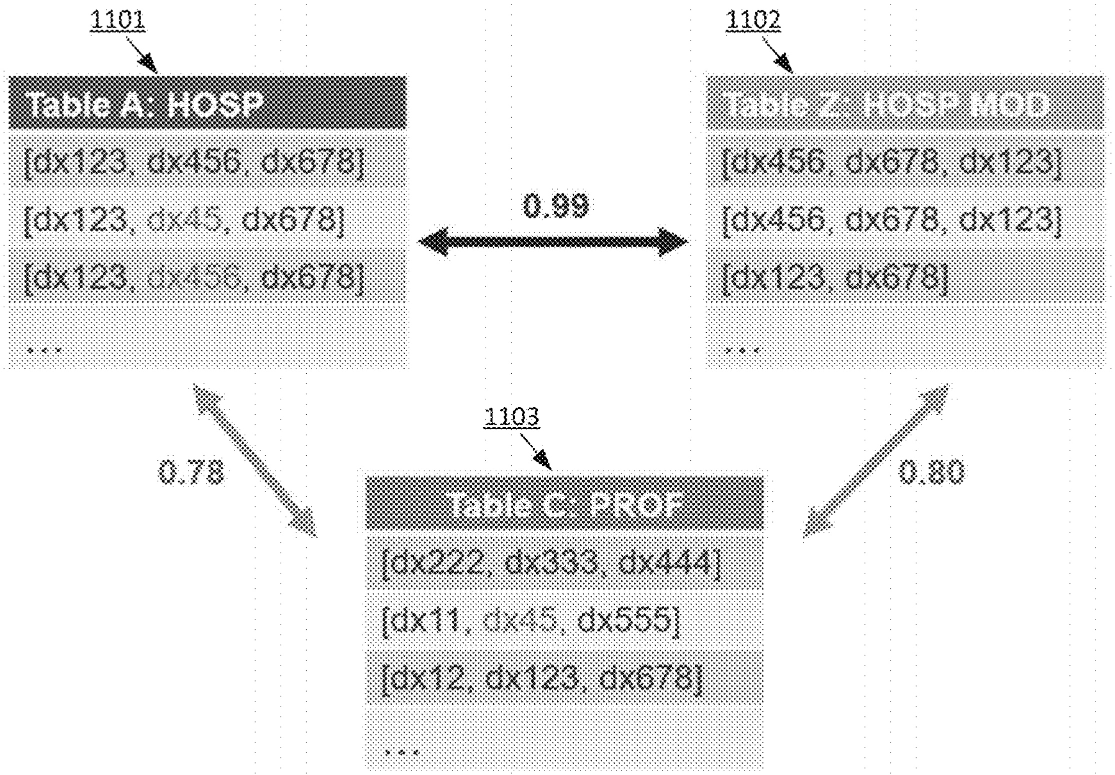

FIGS. 11A and 11B depict operational examples of matching operations for performance in accordance with some embodiments herein.

FIGS. 12A, 12B, 12C, 12D, 12E, and 12F depict operational examples of matching operations for performance in accordance with some embodiments herein.

DETAILED DESCRIPTION

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to schema matching, one of ordinary skill in the art will recognize that the disclosed concepts can be used to perform other types of data analysis.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established, or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 provides an example overview of an architecture that can be used to practice embodiments of the present disclosure. The architecture 100 may include a schema matching system 101 and a schema matching computing entity 106 configured to generate outputs that can be used to perform one or more output-based actions. The schema matching system 101 may communicate with one or more external computing entities 102A-N using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (e.g., network routers, and/or the like).

The architecture 100 includes a storage subsystem 108 configured to store at least a portion of the data utilized by the schema matching system 101. The schema matching computing entity 106 may be in communication with the external computing entities 102A-N. The schema matching computing entity 106 may be configured to: (i) train one or more machine learning models based on a training data store stored in the storage subsystem 108, (ii) store trained machine learning models as part of a model definition data store of the storage subsystem 108, (iii) utilize trained machine learning models to perform an action (e.g., to generate or learn embeddings or other data structures described herein), (iv) and/or the like.

In one example, the schema matching computing entity 106 may be configured to generate an embedding, prediction, classification, and/or any other data insight based on data provided by an external computing entity such as external computing entity 102A, external computing entity 102B, and/or the like.

The storage subsystem 108 may be configured to store the model definition data store and the training data store for one or more machine learning models, and/or to store embeddings generated or utilized herein. The schema matching computing entity 106 may be configured to receive requests and/or data from at least one of the external computing entities 102A-N, process the requests and/or data to generate outputs (e.g., predictive outputs, classification outputs, and/or the like), and provide the outputs to at least one of the external computing entities 102A-N. In some embodiments, the external computing entity 102A, for example, may periodically update/provide raw and/or processed input data to the schema matching system 101. The external computing entities 102A-N may further generate user interface data (e.g., one or more data objects) corresponding to the outputs and may provide (e.g., transmit, send, and/or the like) the user interface data corresponding with the outputs for presentation to the external computing entity 102A (e.g., to an end-user).

The storage subsystem 108 may be configured to store at least a portion of the data utilized by the schema matching computing entity 106 to perform one or more steps/operations and/or tasks described herein. The storage subsystem 108 may be configured to store at least a portion of operational data and/or operational configuration data including operational instructions and parameters utilized by the schema matching computing entity 106 to perform the one or more steps/operations described herein. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The schema matching computing entity 106 can include an analysis engine and/or a training engine. The analysis engine may be configured to perform one or more data analysis techniques.

Example Schema Matching Computing Entity

FIG. 2 provides an example schema matching computing entity 106 in accordance with some embodiments discussed herein. In general, the terms computing entity, computer, entity, device, system, and/or similar words used herein interchangeably may refer to, for example, one or more computers, computing entities, desktops, mobile phones, tablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

The schema matching computing entity 106 may include a network interface 220 for communicating with various computing entities, such as by communicating data, content, information, and/or similar terms used herein interchangeably that can be transmitted, received, operated on, processed, displayed, stored, and/or the like.

In one embodiment, the schema matching computing entity 106 may include or be in communication with a processing element 205 (also referred to as processors, processing circuitry, and/or similar terms used herein interchangeably) that communicate with other elements within the schema matching computing entity 106 via a bus, for example. As will be understood, the processing element 205 may be embodied in a number of different ways including, for example, as at least one processor/processing apparatus, one or more processors/processing apparatuses, and/or the like.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in one or more memory elements including, for example, one or more volatile memories 215 and/or non-volatile memories 210. As such, whether configured by hardware or computer program products, or by a combination thereof, the processing element 205 may be capable of performing steps or operations according to embodiments of the present disclosure when configured accordingly. The processing element 205, for example in combination with the one or more volatile memories 215 and/or or non-volatile memories 210, may be capable of implementing one or more computer-implemented methods described herein. In some implementations, the schema matching computing entity 106 can include a computing apparatus, the processing element 205 can include at least one processor of the computing apparatus, and the one or more volatile memories 215 and/or non-volatile memories 210 can include at least one memory including program code. The at least one memory and the program code can be configured to, upon execution by the at least one processor, cause the computing apparatus to perform one or more steps/operations described herein.

The non-volatile memories 210 (also referred to as non-volatile storage, memory, memory storage, memory circuitry, media, and/or similar terms used herein interchangeably) may include at least one non-volatile memory device 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memories 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The one or more volatile memories (also referred to as volatile storage, memory, memory storage, memory circuitry, media, and/or similar terms used herein interchangeably) can include at least one volatile memory 215 device, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memories 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain embodiments of the operation of the schema matching computing entity 106 with the assistance of the processing element 205.

As indicated, in one embodiment, the schema matching computing entity 106 may also include the network interface 220 for communicating with various computing entities, such as by communicating data, content, information, and/or the like that can be transmitted, received, operated on, processed, displayed, stored, and/or the like. Such communication data may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the schema matching computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Example External Computing Entity

FIG. 3 provides an example external computing entity 102A in accordance with some embodiments discussed herein. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Various parties can operate the external computing entities 102A-N. As shown in FIG. 3, the external computing entity 102A can include an antenna 312, a transmitter 304 (e.g., radio), a receiver 306 (e.g., radio), and/or an external entity processing element 308 (e.g., CPLDs, microprocessors, multi-core processors, coprocessing entities, ASIPs, microcontrollers, and/or controllers) that provides signals to and receives signals from the transmitter 304 and the receiver 306, correspondingly. As will be understood, the external entity processing element 308 may be embodied in a number of different ways including, for example, as at least one processor/processing apparatus, one or more processors/processing apparatuses, and/or the like as described herein with reference to the processing element 205.

The signals provided to and received from the transmitter 304 and the receiver 306, correspondingly, may include signaling information/data in accordance with air interface standards of applicable wireless systems. In this regard, the external computing entity 102A may be capable of operating with one or more air interface standards, communication protocols, modulation types, and access types. More particularly, the external computing entity 102A may operate in accordance with any of a number of wireless communication standards and protocols, such as those described above with regard to the schema matching computing entity 106. In a particular embodiment, the external computing entity 102A may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102A may operate in accordance with multiple wired communication standards and protocols, such as those described above with regard to the schema matching computing entity 106 via an external entity network interface 320.

Via these communication standards and protocols, the external computing entity 102A can communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102A can also download changes, add-ons, and updates, for instance, to its firmware, software (e.g., including executable instructions, applications, program modules), operating system, and/or the like.

According to one embodiment, the external computing entity 102A may include location determining embodiments, devices, modules, functionalities, and/or the like. For example, the external computing entity 102A may include outdoor positioning embodiments, such as a location module adapted to acquire, for example, latitude, longitude, altitude, geocode, course, direction, heading, speed, universal time (UTC), date, and/or various other information/data. In one embodiment, the location module can acquire data such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating a position of the external computing entity 102A in connection with a variety of other systems, including cellular towers, Wi-Fi access points, and/or the like. Similarly, the external computing entity 102A may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments can be used in a variety of settings to determine the location of someone or something to within inches or centimeters.

The external computing entity 102A may include a user interface 316 (e.g., a display, speaker, and/or the like) that can be coupled to the external entity processing element 308. In addition, or alternatively, the external computing entity 102A can include a user input interface 319 (e.g., keypad, touch screen, microphone, and/or the like) coupled to the external entity processing element 308).

For example, the user interface 316 may be a user application, browser, and/or similar words used herein interchangeably executing on and/or accessible via the external computing entity 102A to interact with and/or cause the display, announcement, and/or the like of information/data to a user. The user input interface 318 can comprise any of a number of input devices or interfaces allowing the external computing entity 102A to receive data including, as examples, a keypad (hard or soft), a touch display, voice/speech interfaces, motion interfaces, and/or any other input device. In embodiments including a keypad, the keypad can include (or cause display of) the conventional numeric (0-9) and related keys (#, *, and/or the like), and other keys used for operating the external computing entity 102A and may include a full set of alphabetic keys or set of keys that may be activated to provide a full set of alphanumeric keys. In addition to providing input, the user input interface 318 can be used, for example, to activate or deactivate certain functions, such as screen savers, sleep modes, and/or the like.

The external computing entity 102A can also include one or more external entity volatile memories 322 and/or one or more external entity non-volatile memories 324, which can be embedded within and/or may be removable from the external computing entity 102A. As will be understood, the external entity non-volatile memories 324 and/or the external entity volatile memories 322 may be embodied in a number of different ways including, for example, as described herein with reference the non-volatile memories 210 and/or the external volatile memories 215.

III. Examples of Certain Terms

In some embodiments, the term "schema" refers to a structure or organization of a database or data source and represents a blueprint of how the database or data source is constructed (e.g., divided into tables, if the database or data source is relational.

In some embodiments, the term "data structure" refers to a data structure storing data having an unknown or partially known schema or context. The data structure has multiple records, or a collection of values, and a heading associated with the values. In some embodiments, a data structure is arranged according to a multi-dimensional matrix or table, with at least one column storing records associated with a type of contextual data.

In some embodiments, the term "external embeddings data structure" refers to a data structure storing embeddings data, where the data structure has multiple records, or a collection of embeddings values, and a relationship between the embedding's values and a context or category associated with the embeddings. In some embodiments, an external embeddings data structure is arranged according to a multi-dimensional matrix, with one column storing records associated with a type of data (e.g., ICD10 codes) and another column storing embeddings values associated with each respective record (e.g., or row).

In some embodiments, the term "embeddings source" refers to an external (e.g., external to a computing network) computing entity from which an external embeddings data structure may be sourced.

In some embodiments, the term "embeddings set" refers to one or more items of data associating embedding entries (e.g., an embedding entry from an external embeddings data structure) with a record of a data structure.

In some embodiments, the term "transformation operation" refers to a computing operation performed to transform a data structure into another computing structure. In some embodiments, a transformation may be a row-wise aggregation, a column-wise aggregation, or a machine learning operation. In some embodiments, an aggregation may be one or more of a mean, average, median, minimum, maximum, sum, or other machine learning generated operation.

In some embodiments, the term "embeddings data structure" refers to a data structure resulting from a transformation operation performed on an embeddings set. In some embodiments, the embeddings data structure includes a column containing an original set of data records from a data source, and a column containing row-wise aggregated embeddings values from an embeddings set.

In some embodiments, the term "embeddings representation vector" refers to a data structure resulting from a transformation operation performed on an embeddings data structure. In some embodiments, a column-wise aggregation is performed on a column of an embeddings data structure that contains row-wise aggregated embeddings values.

In some embodiments, the term "similarity metric" refers to one or more items of data that quantifies the similarity between two data structures. In some embodiments, a similarity metric is generated based on two different embeddings representation vectors. In some embodiments the similarity metric is generated based on one or more of a plurality of embeddings representation vectors and one or more of a plurality of embeddings representation structures (e.g., each permutation of combinations of each of the embeddings representation vectors and embeddings representation structures may be compared). In some embodiments, the similarity metric is generated based on a cosine similarity metric, Euclidean distance, a jaccard similarity metric, or a trained machine learning model.

In some embodiments, the term "similarity indication element" refers to graphical interface element representative of a similarity metric or similarity measure/comparison determined to be associated with a first and second data source and/or a first and second data structure.

In some embodiments, the term "data source" refers to a digital repository of data, having its own schema. In some embodiments, the schema is unknown or is partially known. In some embodiments, only a subset of the data from the data source is available for determining a schema of the entire data source.

In some embodiments, the term "taxonomy" refers to a scheme of classification of data (e.g., in some embodiments a hierarchical classification), in which data organized into groups or types.

In some embodiments, the term "schema type element" refers to graphical interface element representative of a schema or content type determined to be associated with a data source or a data structure.

In some embodiments, the terms "trained machine learning model," "machine learning model," "model," "one or more models," or "ML" refer to a machine learning or deep learning task or mechanism. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the model can be trained and/or trained in real-time (e.g., online training) while in use.

The machine learning models as described herein may make use of multiple ML engines, e.g., for analysis, transformation, and other needs. The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

Alternatively, ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or auto-encoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein.

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like

IV. Overview, Technical Improvements, and Technical Advantages

Data analytics tasks require sourcing information from multiple sources. Depending on infrastructure, technologies, and how the data is collected and stored in each of these sources, data can have different schemas. As a result, when combining data, similar fields across datasets cannot be identified by basic methods (e.g., merely selecting or looking at fields with similar names). Indeed, columns with similar names can and often do store data with diverse meanings. Moreover, the manual approach to look into fields across multiple datasets is time consuming and requires specific domain expertise. In existing methods, challenges associated with collecting data from sources that have constraints on sharing information have not been particularly addressed. These complexities underscore the need for an approach for schema matching to automatically identify fields across different data sources that refer to similar information.

Schema matching allows entities to align two or more schemas, or data models, to determine the similarities and differences between them. This however can be time-consuming and difficult (if not impossible in some scenarios) for a number of reasons, even when data dictionaries, data owners and knowledge experts are available:

- Different schemas may use different terminology to describe the same concepts, making it difficult to determine whether two data elements (columns) are equivalent or not;
- Knowledge experts and data owners of different data sources can also be from different backgrounds, making communication regarding schema matching more difficult;
- Different schemas may have different levels of granularity, with one schema providing more detailed information about a given concept than the other. This can make it difficult to align the two schemas at the appropriate level of detail;
- Manual schema matching at large scale can be difficult because it often involves dealing with large, complex schemas, which can be time-consuming and error prone.

Some data analytics projects, for example, in the medical domain, can involve external knowledge sources and data (e.g., from a commercial or external partner). Due to the nature of the involvement of an external provider/source, multiple scenarios arise where access to the entirety of external data is not feasible. Some example scenarios are included below.

- Data can be significantly large, and due to technological and infrastructural restrictions, a data host may only be able to share partial data (e.g., a subset of fields) that is required for the given use case.
- Security and contractual restrictions may limit or prohibit access to sensitive data or proprietary resources. Thus, before proper access requests can be submitted, a manual study of which part of data will be used in the project needs to be conducted.
- Abrasion caused by internal processes can contribute to making access to schema/data time consuming and challenging. For example, data access may only be granted once the project and business value are clearly defined—a study which itself is sometimes dependent on whether the data is of actual use to the project (e.g., access to the data is required for the understanding of whether the data is of use to the project).
- In the context of mergers and acquisitions, once two companies or entities are merged, including, adapting and/or transform both technological stacks as well as databases and datasets is technologically complex, challenging, and time consuming. For example, it is very time consuming and complex to match one by one every table and column.

Because embodiments herein provide for schema matching without having access to the entirety of one or more of the datasets under review for the schema matching, solutions presented herein overcome the aforementioned drawbacks associated with timing before data can be available, the complexity and delay associated with transforming technological stacks before two merged entities can become operational, and the complexity and delay of partial access to complex or large datasets.

Embodiments herein provide for a schema matching approach that alleviates tedious and time-consuming processes, while providing accuracy and without requiring access to an entirety of a dataset. Embodiments herein provide for schema matching in a computationally efficient manner, and that can be performed in a distributed fashion.

In the context of data processing and exploration of large companies that have hundreds of databases comprising millions of tables, having access to data dictionaries and knowledge experts is not enough to efficiently integrate the information on these data sources. Embodiments herein overcome such challenges.

In the context of mergers and acquisitions, embodiments herein provide for a faster technical integration of data sources and datasets and alleviate challenges associated with restrictions over communications between data owners/teams that might exist during the integration process.

In the context of data collaboration with external entities, where the exchange of knowledge and information about the data may be limited due to security and contractual restrictions, embodiments herein provide for schema matching computations to be distributed and underlying data is not required to be shared and can be retained within the company. That is, some of the operations herein that may require access to the raw data can be performed at a data owner's location and only the resulting vector representation needs to be shared back to calculate the similarity metrics. This allows the raw data to be retained within the data owner company.

FIG. 4A depicts an example schema-based matching approach 400. In FIG. 4A, information regarding column names is evaluated and used to determine similarities across disparate data sources. FIG. 4B depicts an example content-based matching approach 410. In FIG. 4B, information regarding values in columns is evaluated and used to determine similarities across disparate data sources. This can include, for example, distributions, data type, proportion of missing values, and the like. FIGS. 5A and 5B depict comparisons associated with schema-based matching approaches and content-based matching approaches, and drawbacks associated therewith.

Embodiments herein provide for distinguishing differences between data sources only if they have fundamentally different data, but also in scenarios where they consist of the same values but from different sources (e.g., distinguishing institutional ICD codes of institutional medical claims from professional medical claims). Embodiments herein further provide for identifying similarities between data sources that have similar data but different ranges (e.g., one has missing values; one has ICD codes of the same diagnosis but from higher levels in a taxonomy; one having ICD codes in a different order; etc.).

In some embodiments, automated actions may be initiated based on a determination that data sets share a schema and/or that a data set contains values associated with a particular context. Examples of the automated actions may include automatic merging of the data sets (e.g., generating a larger data set that includes both data sets and updating the schema and/or values to align with a desired schema in a repository), automatic updating of one or more of the data sets, triggering alerts via transmission of an interface for rendering via a remote computing entity, triggering alerts via displaying a renderable interface displaying information associated with whether the data sets share a schema, whether more information is needed, and/or what content has been determined to be stored by the data set, determining the source of the merged data set content (e.g., first data set is determined to be professional claims, and an automated action may include determining that the second data set is institutional claims, so the automated action can identify or label the content of the merged data to be institutional/professional claim), triggering an alert that a dataset is missing a schema (e.g., column), triggering an alert that two datasets share the same content, and/or the like.

V. Example System Operations

As noted previously, because embodiments herein provide for schema matching without having access to the entirety of one or more of the datasets under review for the schema matching, solutions presented herein overcome the aforementioned drawbacks associated with timing before data can be available, the complexity and delay associated with transforming technological stacks before two merged entities can become operational, and the complexity and delay of partial access to complex or large datasets. Further, it will be appreciated that, while embodiments depicted herein are described with respect to data structures resembling columns and tables, data structures having different structures and/or dimensions are within the scope of the present disclosure.

FIG. 6A depicts an example process 600 for determining similarity and/or schema matching between multiple data sources, in accordance with some embodiments of the present disclosure. Via the various steps/operations of the process 600, a schema matching computing entity 106 can efficiently and effectively determine schema matching between disparate and unknown data sources.

In some embodiments, the process 600 begins at step/operation 601 when the schema matching computing entity 106 generates a first embeddings set. For example, the schema matching computing entity 106 may generate the first embeddings set based on a first data structure and a first external embeddings data structure. The first embeddings set may include a respective embedding entry for each record of the first data structure.

In some embodiments, the process 600 continues at step/operation 602 when the schema matching computing entity 106 generates a second embeddings set. For example, the schema matching computing entity 106 may generate the second embeddings set based on a second data structure and a second external embeddings data structure. The second embeddings set may include a respective embedding entry for each record of the second data structure.

In some embodiments, the process 600 continues at step/operation 603 when the schema matching computing entity 106 transforms the first embeddings set into a first embeddings data structure and transforms the second embeddings set into a second embeddings data structure. For example, the schema matching computing entity 106 may perform a first transformation operation (e.g., a row-wise aggregation) to each of the first embeddings set and second embeddings set to generate the first embeddings data structure and the second embeddings data structure.

In some embodiments, the process 600 continues at step/operation 604 when the schema matching computing entity 106 transforms the first embeddings data structure and the second embeddings data structure into a first embeddings representation vector and a second embeddings representation vector, respectively. For example, the schema matching computing entity 106 may perform a second transformation operation (e.g., a column-wise aggregation) to each of the first embeddings data structure and the second embeddings data structure to generate the first embeddings representation vector and the second embeddings representation vector.

In some embodiments, the process 600 continues at step/operation 605 when the schema matching computing entity 106 generates, based on a similarity metric generated based on the first embeddings representation vector and the second embeddings representation vector, a similarity indication element associated with the first data structure and the second data structure. FIG. 6B depicts example operations 620 for determining similarity and/or schema matching between a data source using multiple embeddings sources, in accordance with some embodiments of the present disclosure. Via the various steps/operations of the process 620, a schema matching computing entity 106 can efficiently and effectively determine schema matching or content type for a data source.

In some embodiments, the process 620 begins at step/operation 621 when the schema matching computing entity 106 generates a plurality of external embeddings sets. For example, schema matching computing entity 106 may generate the plurality of external embeddings sets based on a first data structure and plurality of external embeddings data structures. The plurality of external embeddings sets may each comprise an embedding entry for each record of the first data structure for each of the plurality of external embeddings data structures.

In some embodiments, the process 620 continues at step/operation 622 when the schema matching computing entity 106 transforms the plurality of external embeddings sets into a respective embeddings data structure of a plurality of embeddings data structures. For example, the schema matching computing entity 106 may perform a first transformation operation (e.g., a row-wise aggregation) on each of the plurality of external embeddings sets to generate a plurality of embeddings data structures.

In some embodiments, the process 620 continues at step/operation 623 when the schema matching computing entity 106 transforms the plurality of embeddings data structures into a plurality of embeddings representation vectors. For example, the schema matching computing entity 106 may perform a second transformation operation (e.g., a column-wise aggregation) on each of the plurality of embeddings data structures to generate the plurality of embeddings representation vectors.

In some embodiments, the process 620 continues at step/operation 624 when the schema matching computing entity 106 transforms the plurality of external embeddings data structures into a plurality of embeddings representation structures. For example, the schema matching computing entity 106 may perform the second transformation operation (e.g., a column-wise aggregation) on each of the plurality of external embeddings data structures to generate the plurality of embeddings representation structures.

In some embodiments, the process 620 continues at step/operation 625 when the schema matching computing entity 106 generates a schema type element associated with the first data structure. For example, the schema matching computing entity 106 may generate the schema type element based on one or more similarity metrics generated based on one or more of the plurality of embeddings representation vectors and one or more of the plurality of embeddings representation structures.

FIGS. 7A and 7B depict operational examples of matching operations for performance in accordance with some embodiments herein. Data structures are depicted herein using medical claims data, however other domains of data and applications are within the scope of the present disclosure.

Shown in FIG. 7A are example data structures 700 and 710. Data structure 700 (e.g., Table A) contains data, for example, from medical claims at a medical claim level (e.g., each claim can have one or more codes associated therewith); each record 701A, 702A, 703A shown in data structure 700 contains three codes. Data structure 710 (e.g., Table Z) contains data, for example, from medical claims at a medical claim level (e.g., each claim can have one or more codes associated therewith); each record 711A, 712A shown in data structure 710 has three codes with the exception of the third record 713A which has two codes. Shown in FIG. 7B, codes in data structure 700 (e.g., Table A) and codes in data structure 710 (e.g., Table Z) may possibly have mismatched characteristics depending upon their respective domains (or collective domain) (e.g., a medical domain). However, because codes associated with records (e.g., medical claims) can have similarities and follow similar or the same taxonomy, row 702A in data structure 700 (e.g., Table A) is not necessarily different from row 712A in data structure 710 (e.g., Table Z). That is, row 702A contains a "dx45" code that may not be entirely different from code "dx456" of row 712A. Also, 703A appears to contain a code "dx456" that is missing from 713A.

FIGS. 8A, 8B, 8C, 8D, 8E, and 8F depict operational examples of matching operations for performance in accordance with some embodiments herein.

Figure 8A:
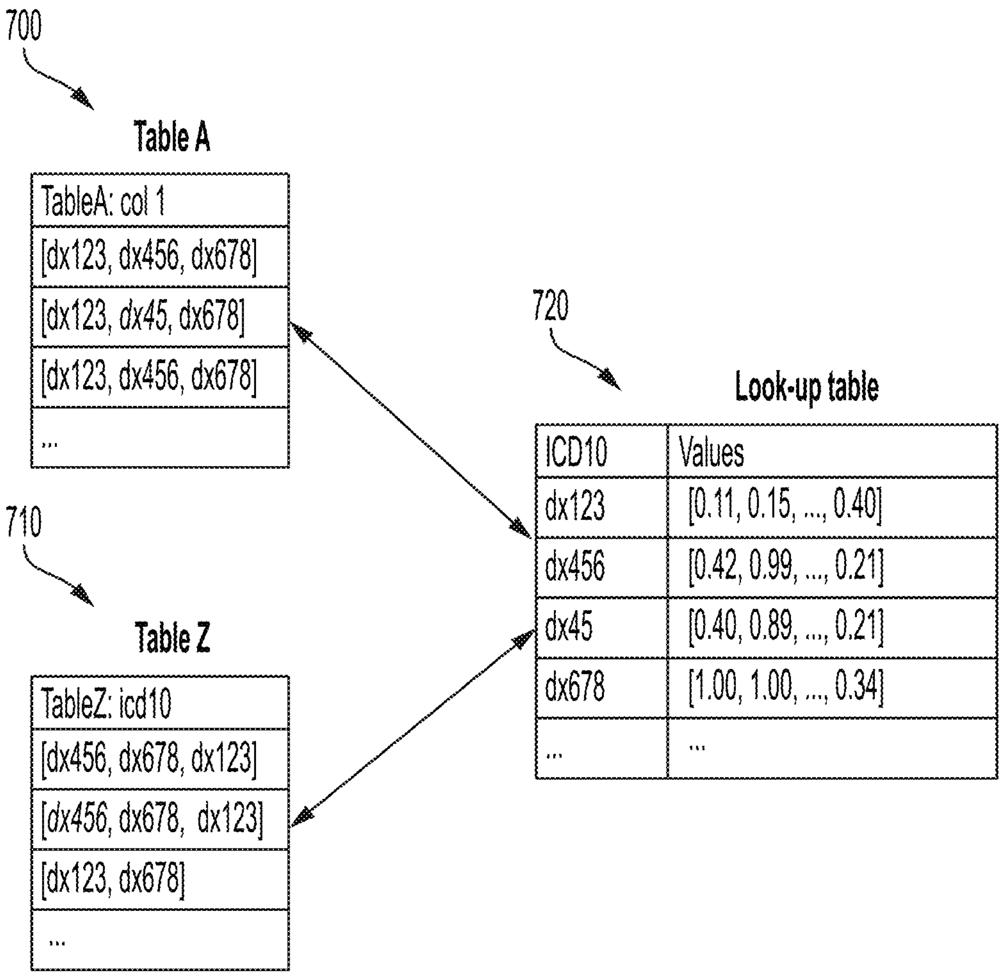

Shown in FIG. 8A, a first data structure 700A (e.g., Table A) is associated with a first data set (e.g., received or retrieved from a first data source, not shown) and a second data structure 710A (e.g., Table Z) is associated with a second data set (e.g., received or retrieved from a second data source, not shown). The respective schemas of each of the data structures 700A and 710A are unknown, and therefore merging the first and second data sets is not feasible without a tedious, manual, and complex process (if the data were even available for a manual review).

In some embodiments, and with reference to FIG. 8A, a schema matching computing entity 106 of a schema matching system 101 is configured to, for each code in each column or other portion of a data structure under consideration (e.g., Table A or 700, "col. 1"; Table Z or 710, "icd10"), retrieve embedding values from one or more external embedding sources 720. An example external embedding source 720 may be a multi-dimensional matrix having multiple columns. In the example depicted in FIG. 8A, external embedding source 720 consists of two columns—one representing terms or codes and the other representing corresponding embeddings associated with the codes. In FIG. 8B, a schema matching computing entity 106 of a schema matching system 101 is configured to append or associate the resulting embeddings 800 to or with the first data structure 700 and append or associate the resulting embeddings 810 to or with the second data structure 710.

In some embodiments, the embeddings are numerical values, however the embeddings may be other types of representations or characters. In some embodiments, the embeddings (e.g., or representations or values) are generated and/or and derived from different resources and for different purposes, including external knowledge sources, embeddings from particular taxonomies, embeddings that are results of different techniques applied on different corpuses (e.g., word2vec, sentence2vec, or pre-trained Language Model as BERT, etc., applied on general domain English text, and/or bio-word2vec, bio-sentence2vec, BioBERT, etc., applied on Medical domain English text), internal or proprietary knowledge, embeddings generated from all or partial available data (e.g., word2vec applied on all CPT codes available for all or a subset of available data), embeddings generated from different parts of a business (e.g., word2vec on pre-pay or post-pay, clinical or non-clinical, facility or physician, etc.), embeddings as a product of machine learning (ML) models used in production, and/or the like.

Shown in FIG. 8C, in some embodiments, a schema matching computing entity 106 of a schema matching system 101 is configured to, for each mapped code (e.g., for each mapped set of embeddings associated with a code), generate a row-wise aggregation so that what results is a single representation for each row. That is, for each row in data structure 700, the corresponding embeddings 800 are aggregated into a row-wise aggregation of data structure 820. Similarly, for each row in data structure 710, the corresponding embeddings 810 are aggregated into a row-wise aggregation of data structure 830. In some embodiments the row-wise aggregation is numerical (e.g., mean, mix, max, median); in other embodiments the row-wise aggregation is generated based on machine learning or other approaches (e.g., tf-idf, neural networks, trained models, and more).

Shown in FIG. 8D, in some embodiments, each record is represented by the aggregation of each embedding, as shown in 840 (corresponding to data structure 700) and 850 (corresponding to data structure 710.

Shown in FIG. 8E, in some embodiments, a schema matching computing entity 106 of a schema matching system 101 is configured to generate a column-wise aggregation of the row-wise aggregations generated based on the embeddings of the mapped codes. That is, a column-wise aggregation vector 860 of the aggregated row-wise embeddings shown in 840 is generated for data structure 700. Further, a column-wise aggregation vector 870 of the aggregated row-wise embeddings shown in 850 is generated for data structure 710. In some embodiments the column-wise aggregation is numerical (e.g., mean, mix, max, median); in other embodiments the column-wise aggregation is generated based on machine learning or other approaches (e.g., tf-idf, neural networks, trained models, and more).

Figure 8F:
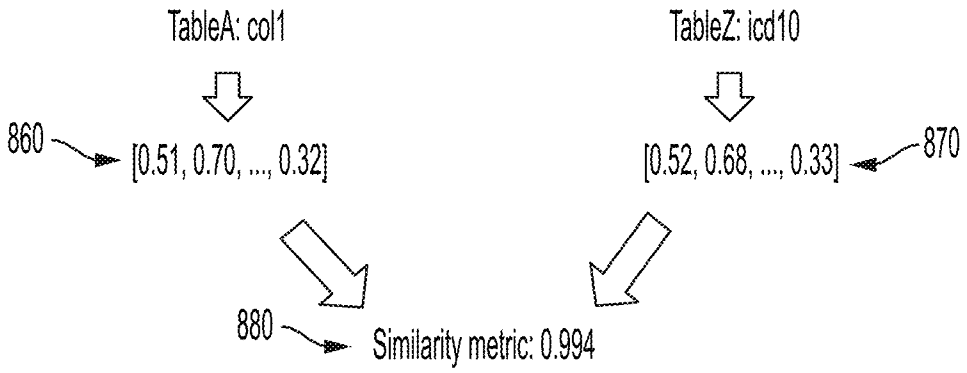

Shown in FIG. 8F, in some embodiments, a schema matching computing entity 106 of a schema matching system 101 is configured to generate a similarity metric 880 based on the column-wise aggregation vectors 860, 870. In some embodiments, the similarity metric 880 is generated based on statistical techniques, cosine similarity, other similarity metrics, and/or machine learning approaches (e.g., neural networks, trained models, and more).

In some embodiments, a schema matching computing entity 106 of a schema matching system 101 is configured to identify columns or data structures having highest relative similarity metrics (e.g., as compared to other columns or data structures) to contain similar content and therefore have the highest likelihood of containing the same content or the same type of content. In some embodiments, identifying columns having similar content is based on comparing the similarity metric 880 to a similarity metric threshold, where the similarity metric threshold is pre-defined or generated based on machine learning or other techniques.

FIGS. 9A and 9B depict operational examples of matching operations for performance in accordance with some embodiments herein. In some embodiments, and with reference to FIG. 9A, a schema matching computing entity 106 of a schema matching system 101 is configured to, for each code in each column or other portion of a data structure under consideration (e.g., Table A or 910, "col. 1"), retrieve embedding values from multiple external embedding sources 920, 930, 940. Example external embedding sources 920, 930, 940 may be a multi-dimensional matrix having multiple columns. In the examples depicted in FIG. 9A, external embedding source 920 consists of two columns—one 920A representing terms or codes and the other representing corresponding embeddings 920B associated with the codes; external embedding source 930 consists of two columns—one 930A representing terms or codes and the other representing corresponding embeddings 930B associated with the codes; external embedding source 940 consists of two columns—one 940A representing terms or codes and the other representing corresponding embeddings 940B associated with the codes. In some embodiments, the different external embedding sources 920, 930, 940 are associated with unique sources or taxonomies. In FIG. 9B, a schema matching computing entity 106 of a schema matching system 101 is configured to append or associate the resulting embeddings 925, 935, 945 to or with the first data structure 910.

In some embodiments, different weights may be applied to embeddings associated with different external embeddings sources (e.g., apply a weighting of 0.6 to embeddings from source 920, a weighting of 0.2 to embeddings from source 930, and a weighting of 0.2 to other embeddings 940). In such embodiments, the two or more columns for the embeddings may be merged.

FIGS. 10A, 10B, and 10C depict operational examples of matching operations for performance in accordance with some embodiments herein. In some embodiments, because embeddings are used that are generated from diverse and different sources (e.g., and using different methodologies), the intrinsic knowledge of these representations may be exploited herein to extract diverse sets of information. For example, whether a column is used in a given domain (e.g., clinical, or non-clinical) or situation (e.g., pre-pay or post-pay) can be gleaned using embodiments herein.

Shown in FIG. 10A, in some embodiments, a schema matching computing entity 106 of a schema matching system 101 is configured to transform resulting embeddings 925, 935, 945 associated with first data structure 910 (e.g., described with respect to the examples depicted in FIGS. 9A-9B) into vector representations 1025, 1035, 1045, respectively. Shown in FIG. 10B, in some embodiments, a schema matching computing entity 106 of a schema matching system 101 is configured to transform columns from each of external embedding sources 920, 930, and 940 into external embedding representation vectors 1020, 1030, and 1040, respectively.

Referring to FIG. 10C, in some embodiments, a schema matching computing entity 106 of a schema matching system 101 is configured to generate similarity metrics for every permutation of vector representations 1025, 1035, 1045 and external embedding representation vectors 1020, 1030, and 1040 (e.g., 1025 vs. 1020; 1025 vs. 1030; 1025 vs. 1040; 1020 vs. 1035, 1020 vs. 1045; 1030 vs. 1035; 1030 vs. 1045; 1040 vs. 1045; etc.). FIG. 10C depicts examples of comparisons of representations; for example, Table A: col 1 shows a highest similarity (1035) with external embedding source 930 (1030). Such a result supports a conclusion that Table A: col 1 contains Facility type data (e.g., the type of data associated with external embedding source 930).

FIGS. 11A and 11B depict operational examples of matching operations for performance in accordance with some embodiments herein. FIG. 11A depicts possible mismatches between similar columns. For example, similar columns or data structures may contain different orders, missing values, or different levels in a hierarchy or taxonomy. By way of further example, different columns or data structures may show similarities with respect to codes or taxonomies used. Shown in FIG. 11B, a first data structure 1101 may show a higher similarity metric compared to a second data structure 1102 where there are different orders of values, missing values, or different levels in a hierarchy or taxonomy than it would show compared to a third data structure 1103 where different columns or data structures may show similarities with respect to codes or taxonomies used.

FIGS. 12A, 12B, 12C, 12D, 12E, and 12F depict operational examples of matching operations for performance in accordance with some embodiments herein. For example, it may be known that a column contains ICD codes, however embodiments herein provide for identifying the specific source of the ICD codes (e.g., hospital claims).

Figure 12A:
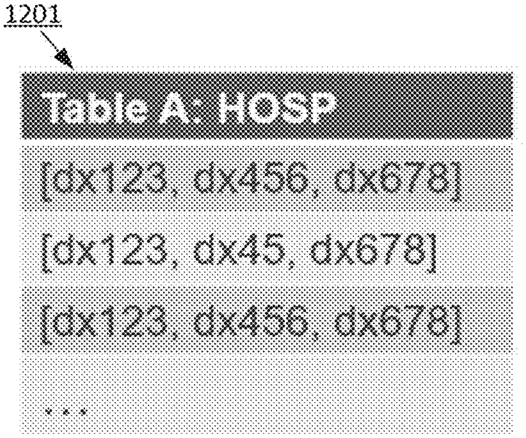
Figure 12B:
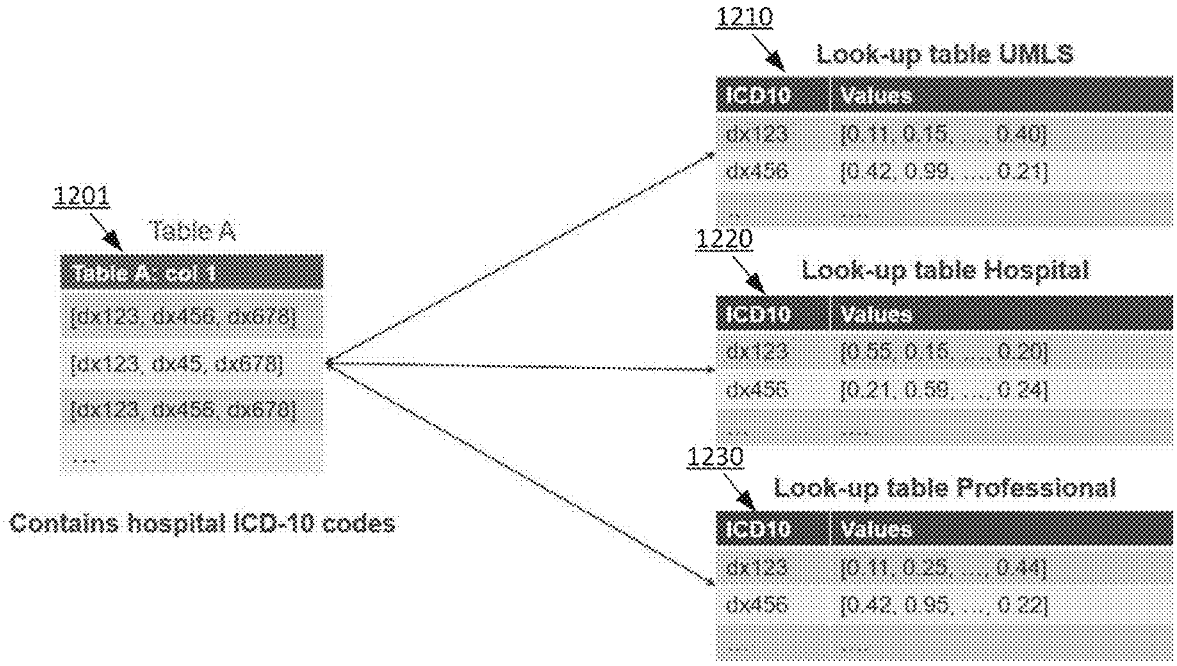

In some embodiments, and with reference to FIGS. 12A and 12B, a schema matching computing entity 106 of a schema matching system 101 is configured to, for each code in each column or other portion of a data structure under consideration (e.g., Table A or 1201, "col. 1"), retrieve embedding values from multiple external embedding sources 1210, 1220, 1230. Example external embedding sources 1210, 1220, 1230 may each be a multi-dimensional matrix having multiple columns. In some embodiments, the different external embedding sources 1210, 1220, 1230 are associated with unique sources or taxonomies. In FIG. 12C, in some embodiments, a schema matching computing entity 106 of a schema matching system 101 is configured to append or associate the resulting embeddings 1212, 1222, 1232 to or with the first data structure 1201. Also shown in FIG. 12C, in some embodiments, a schema matching computing entity 106 of a schema matching system 101 is configured to transform resulting embeddings 1212, 1222, 1232 associated with first data structure 1201 into vector representations 1215, 1225, 1235, respectively.

Figure 12D:
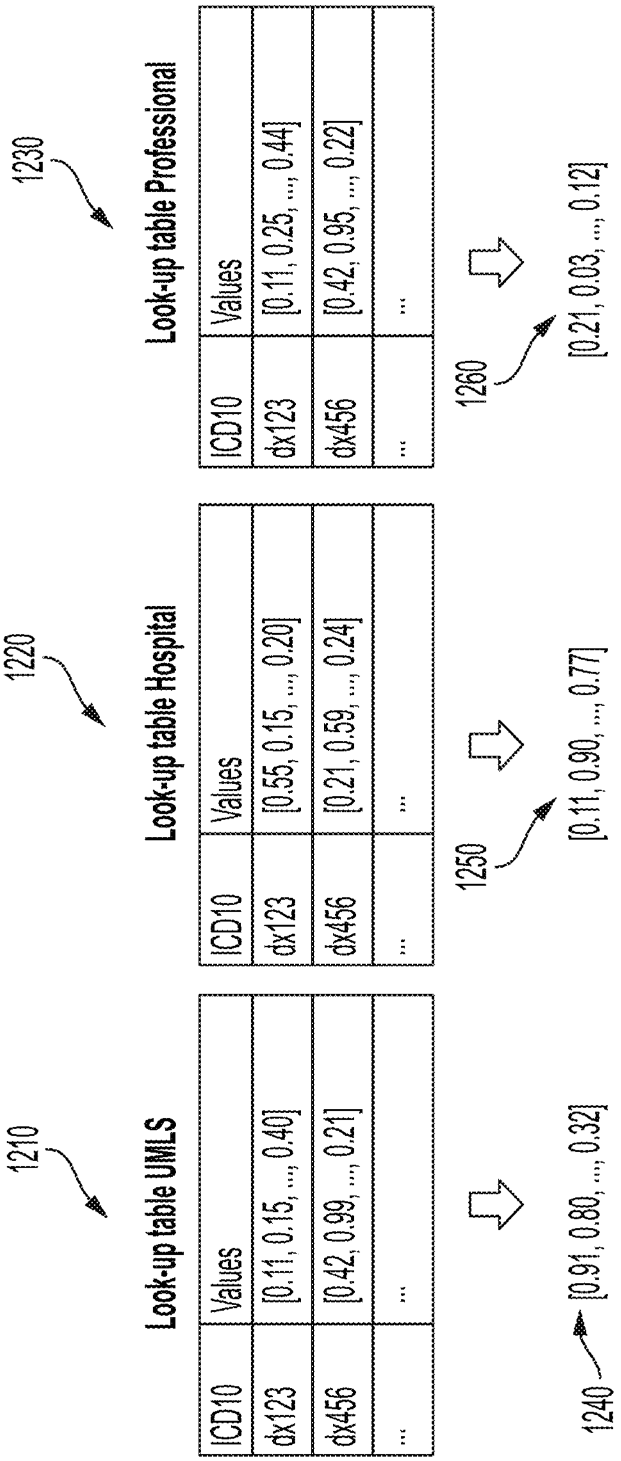
Figures 12E, 12F:
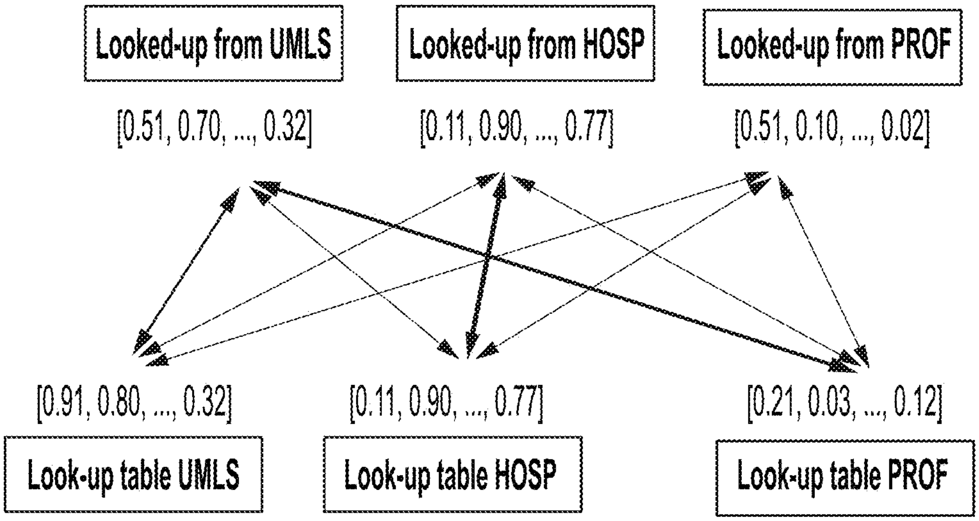

In FIG. 12D, in some embodiments, a schema matching computing entity 106 of a schema matching system 101 is configured to transform columns from each of external embedding sources 1210, 1220, 1230 into external embedding representation vectors 1240, 1250, and 1260, respectively. Referring to FIGS. 12E and 12F, in some embodiments, a schema matching computing entity 106 of a schema matching system 101 is configured to generate similarity metrics for every permutation of vector representations 1215, 1225, 1235 and external embedding representation vectors 1240, 1250, and 1260. FIG. 12E depicts example similarity metrics, and FIG. 12F depicts comparison permutations.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

In some example embodiments, a system comprising memory and one or more processors communicatively coupled to the memory, the one or more processors configured to generate, based on a first data structure and a first external embeddings data structure, a first embeddings set, the first embeddings set comprising a first respective embedding entry for each first record of the first data structure. The one or more processors may be further configured to generate, based on a second data structure and a second external embeddings data structure, a second embeddings set, the second embeddings set comprising a second respective embedding entry for each second record of the second data structure. The one or more processors may be further configured to transform, based on a first transformation operation, the first embeddings set into a first embeddings data structure. The one or more processors may be further configured to transform, based on the first transformation operation, the second embeddings set into a second embeddings data structure. The one or more processors may be further configured to transform, based on a second transformation operation, the first embeddings data structure into a first embeddings representation vector. The one or more processors may be further configured to transform, based on the second transformation operation, the second embeddings data structure into a second embeddings representation vector. The one or more processors may be further configured to generate a similarity metric based on the first embeddings representation vector and the second embeddings representation vector. The one or more processors may be further configured to, based on the similarity metric, generate a similarity indication element associated with the first data structure and the second data structure.

In some of these embodiments, the one or more processors may be further configured to receive or retrieve the first data structure from a first data source, and receive or retrieve the second data structure from a second data source.

In some of these embodiments, the first external embeddings data structure is associated with a first external embeddings source and a first taxonomy.

In some of these embodiments, the second external embeddings data structure is associated with a second external embeddings source and a second taxonomy.

In some of these embodiments, the first data structure comprises a first plurality of first records arranged according to a first matrix and the second data structure comprises a second plurality of second records arranged according to a second matrix. In some of these embodiments, the first transformation operation comprises a row-wise aggregation. In some of these embodiments, the second transformation operation comprises a column-wise aggregation.

In some of these embodiments, the similarity metric is generated based on a cosine similarity metric, a Euclidean distance, or a jaccard similarity metric.

In some of these embodiments, the first transformation operation is based on a first trained machine learning model and the second transformation operation is based on a second trained machine learning model.

In some of these embodiments, the first external embeddings data structure is generated based on a first trained embeddings machine learning model.

In some of these embodiments, the second external embeddings data structure is generated based on a second trained embeddings machine learning model.

In some example embodiments, one or more non-transitory computer-readable storage media include instructions that, when executed by one or more processors, cause the one or more processors to generate, based on a first data structure and a first external embeddings data structure, a first embeddings set, the first embeddings set comprising a first respective embedding entry for each first record of the first data structure. The one or more processors may be further caused to generate, based on a second data structure and a second external embeddings data structure, a second embeddings set, the second embeddings set comprising a second respective embedding entry for each second record of the second data structure. The one or more processors may be further caused to transform, based on a first transformation operation, the first embeddings set into a first embeddings data structure. The one or more processors may be further caused to transform, based on the first transformation operation, the second embeddings set into a second embeddings data structure. The one or more processors may be further caused to transform, based on a second transformation operation, the first embeddings data structure into a first embeddings representation vector. The one or more processors may be further caused to transform, based on the second transformation operation, the second embeddings data structure into a second embeddings representation vector. The one or more processors may be further caused to generate a similarity metric based on the first embeddings representation vector and the second embeddings representation vector. The one or more processors may be further caused to, based on the similarity metric, generate a similarity indication element associated with the first data structure and the second data structure.

In some example embodiments, a computer-implemented method comprises generating, by one or more processors and based on a first data structure and a first external embeddings data structure, a first embeddings set, the first embeddings set comprising a first respective embedding entry for each first record of the first data structure. The computer-implemented method may further comprise generating, by the one or more processors and based on a second data structure and a second external embeddings data structure, a second embeddings set, the second embeddings set comprising a second respective embedding entry for each second record of the second data structure, The computer-implemented method may further comprise transforming, by the one or more processors and based on a first transformation operation, the first embeddings set into a first embeddings data structure. The computer-implemented method may further comprise transforming, by the one or more processors and based on the first transformation operation, the second embeddings set into a second embeddings data structure. The computer-implemented method may further comprise transforming, by the one or more processors and based on a second transformation operation, the first embeddings data structure into a first embeddings representation vector. The computer-implemented method may further comprise transforming, by the one or more processors and based on the second transformation operation, the second embeddings data structure into a second embeddings representation vector. The computer-implemented method may further comprise generating, by the one or more processors, a similarity metric based on the first embeddings representation vector and the second embeddings representation vector. The computer-implemented method may further comprise, based on the similarity metric, generating, by the one or more processors, a similarity indication element associated with the first data structure and the second data structure.

In some example embodiments, a system comprises memory and one or more processors communicatively coupled to the memory, the one or more processors configured to generate, based on a first data structure and plurality of external embeddings data structures, a plurality of external embeddings sets, the plurality of external embeddings sets each comprising an embedding entry for each record of the first data structure for each of the plurality of external embeddings data structures. The one or more processors may be configured to transform, based on a first transformation operation, each of the plurality of external embeddings sets into a respective embeddings data structure of a plurality of embeddings data structures. The one or more processors may be configured to transform, based on a second transformation operation, the plurality of embeddings data structures into a plurality of embeddings representation vectors. The one or more processors may be configured to transform, based on the second transformation operation, the plurality of external embeddings data structures into a plurality of embeddings representation structures. The one or more processors may be configured to generate one or more similarity metrics based on one or more of the plurality of embeddings representation vectors and one or more of the plurality of embeddings representation structures. The one or more processors may be configured to, based on the one or more similarity metrics, generate a schema type element associated with the first data structure.

In some of these embodiments, one or more of the plurality of external embeddings data structures is associated with a unique external embeddings source and a unique taxonomy. In some of these embodiments, the first transformation operation comprises a row-wise aggregation and the second transformation operation comprises a column-wise aggregation. In some of these embodiments, the one or more similarity metrics are generated based on a cosine similarity metric, Euclidean distance, or a jaccard similarity metric. In some of these embodiments, the first transformation operation is based on a first trained machine learning model and the second transformation operation is based on a second trained machine learning model. In some of these embodiments, one or more of the plurality of external embeddings data structures are generated based on a trained embeddings machine learning model. In some of these embodiments, one or more of the row-wise aggregation or the column-wise aggregation comprises one or more of a mean, average, sum, or machine learning generated operation. In some of these embodiments, different weights are applied to embedding entries associated with different external embeddings sets. In some of these embodiments, two or more columns for embedding entries are merged.

In some example embodiments, one or more non-transitory computer-readable storage media include instructions that, when executed by one or more processors, cause the one or more processors to generate, based on a first data structure and plurality of external embeddings data structures, a plurality of external embeddings sets, the plurality of external embeddings sets each comprising an embedding entry for each record of the first data structure for each of the plurality of external embeddings data structures. The one or more processors may further be caused to transform, based on a first transformation operation, each of the plurality of external embeddings sets into a respective embeddings data structure of a plurality of embeddings data structures. The one or more processors may further be caused to transform, based on a second transformation operation, the plurality of embeddings data structures into a plurality of embeddings representation vectors. The one or more processors may further be caused to transform, based on the second transformation operation, the plurality of external embeddings data structures into a plurality of embeddings representation structures. The one or more processors may further be caused to generate one or more similarity metrics based on one or more of the plurality of embeddings representation vectors and one or more of the plurality of embeddings representation structures. The one or more processors may further be caused to, based on the one or more similarity metrics, generate a schema type element associated with the first data structure.

In some example embodiments, a computer-implemented method comprises generating, by one or more processors and based on a first data structure and plurality of external embeddings data structures, a plurality of external embeddings sets, the plurality of external embeddings sets each comprising an embedding entry for each record of the first data structure for each of the plurality of external embeddings data structures. The computer-implemented method may further comprise transforming, by the one or more processors and based on a first transformation operation, each of the plurality of external embeddings sets into a respective embeddings data structure of a plurality of embeddings data structures. The computer-implemented method may further comprise transforming, by the one or more processors and based on a second transformation operation, the plurality of embeddings data structures into a plurality of embeddings representation vectors. The computer-implemented method may further comprise transforming, by the one or more processors and based on the second transformation operation, the plurality of external embeddings data structures into a plurality of embeddings representation structures. The computer-implemented method may further comprise generating, by the one or more processors, one or more similarity metrics based on one or more of the plurality of embeddings representation vectors and one or more of the plurality of embeddings representation structures. The computer-implemented method may further comprise, based on the one or more similarity metrics, generating, by the one or more processors, a schema type element associated with the first data structure.

The invention claimed is:

1. A system comprising one or more processors and at least one memory storing processor executable instructions that, when executed by the one or more processors, cause the one or more processors to perform operations comprising:

generating, for a first data structure associated with a first data set and based at least in part on an external embeddings data structure comprising a lookup table, a first embeddings set by appending, for each (1) first code of the first data structure or (2) first portion of the first data structure and to the first data structure, a corresponding embedding of one or more first corresponding embeddings in the lookup table for the first code of the first data structure or the first portion of the first data structure;

generating, for a second data structure associated with a second data set and based at least in part on the lookup table of the external embeddings data structure, a second embeddings set by appending, for each (1) second code of the second data structure or (2) second portion of the second data structure and to the second data structure, a corresponding embedding of the one or more second corresponding embeddings in the lookup table for the second code of the second data structure or the second portion of the second data structure;

generating a plurality of first row representations for the first embeddings set by aggregating the one or more first corresponding embeddings in the first embeddings set such that each row in the first data structure is aggregated into a first single row representation;

generating a plurality of second row representations for the second embeddings set by aggregating the one or more second corresponding embeddings in the second embeddings set such that each row in the second data structure is aggregated into a second single row representation;

generating a first column representation for the first embeddings set by aggregating the plurality of first row representations;

generating a second column representation for the second embeddings set by aggregating the plurality of second row representations;

generating a similarity metric based on the first column representation and the second column representation;

based on the similarity metric, generating a similarity indication element associated with the first data structure and the second data structure; and providing the similarity indication element associated with the first data structure and the second data structure while restricting access to raw data contained in the first data structure and the second data structure.

2. The system of claim 1, wherein the operations further comprise:

receiving the first data structure from a first data source; and receiving the second data structure from a second data source.

3. The system of claim 1, wherein the first data structure comprises a first plurality of first records arranged according to a first matrix and the second data structure comprises a second plurality of second records arranged according to a second matrix.

4. The system of claim 3, wherein the first data structure is associated with a first unknown schema.

5. The system of claim 4, wherein the second data structure is associated with a second unknown schema.

6. The system of claim 1, wherein the similarity metric is generated based on a cosine similarity metric, a Euclidean distance, or a Jaccard similarity metric.

7. The system of claim 1, wherein the lookup table contains a first column representing terms or codes and a second column representing corresponding embeddings associated with the terms or codes.

8. The system of claim 1, wherein the external embeddings data structure is generated based on a trained embeddings machine learning model.

9. The system of claim 1, wherein:

the first code of the first data structure or the first portion of the first data structure includes a first medical code;

the second code of the second data structure or the second portion of the second data structure includes a second medical code; and the first medical code and the second medical code are either (1) codes of a same diagnosis but from different levels in a taxonomy or (2) a same code but one of the first medical code or the second medical code has a missing value relative to the other.

10. A computer-implemented method, comprising:

generating, by one or more processors and for a first data structure associated with a first data set and based at least in part on an external embeddings data structure comprising a lookup table, a first embeddings set by appending, for each (1) first code of the first data structure or (2) first portion of the first data structure and to the first data structure, a corresponding embedding of one or more first corresponding embeddings in the lookup table for the first code of the first data structure or the first portion of the first data structure;

generating, by the one or more processors and for a second data structure associated with a second data set and based at least in part on the lookup table of the external embeddings data structure, a second embeddings set by appending, for each (1) second code of the second data structure or (2) second portion of the second data structure and to the second data structure, a corresponding embedding of the one or more second corresponding embeddings in the lookup table for the second code of the second data structure or the second portion of the second data structure;

generating, by the one or more processors, a plurality of first row representations for the first embeddings set by aggregating the one or more first corresponding embeddings in the first embeddings set such that each row in the first data structure is aggregated into a first single row representation;

generating, by the one or more processors, a plurality of second row representations for the second embeddings set by aggregating the one or more second corresponding embeddings in the second embeddings set such that each row in the second data structure is aggregated into a second single row representation;

generating, by the one or more processors, a first column representation for the first embeddings set by aggregating the plurality of first row representations;

generating, by the one or more processors, a second column representation for the second embeddings set by aggregating the plurality of second row representations;

generating, by the one or more processors, a similarity metric based on the first column representation and the second column representation;

based on the similarity metric, generating, by the one or more processors, a similarity indication element associated with the first data structure and the second data structure; and providing, by the one or more processors, the similarity indication element associated with the first data structure and the second data structure while restricting access to raw data contained in the first data structure and the second data structure.

11. The computer-implemented method of claim 10, further comprising:

receiving the first data structure from a first data source; and receiving the second data structure from a second data source.

12. The computer-implemented method of claim 10, wherein the first data structure comprises a first plurality of first records arranged according to a first matrix and the second data structure comprises a second plurality of second records arranged according to a second matrix.

13. The computer-implemented method of claim 12, wherein the first data structure is associated with a first unknown schema and wherein the second data structure is associated with a second unknown schema.

14. The computer-implemented method of claim 10, wherein the similarity metric is generated based on a cosine similarity metric, a Euclidean distance, or a Jaccard similarity metric.

15. The computer-implemented method of claim 10, wherein the lookup table contains a first column representing terms or codes and a second column representing corresponding embeddings associated with the terms or codes.

16. The computer-implemented method of claim 10, wherein the external embeddings data structure is generated based on a trained embeddings machine learning model.

17. One or more non-transitory computer-readable storage media storing instructions that, when executed by one or more processors, cause the one or more processors to perform operations comprising:

generating, for a first data structure associated with a first data set and based at least in part on an external embeddings data structure comprising a lookup table, a first embeddings set by appending, for each (1) first code of the first data structure or (2) first portion of the first data structure and to the first data structure, a corresponding embedding of one or more first corresponding embeddings in the lookup table for the first code of the first data structure or the first portion of the first data structure;

generating, for a second data structure associated with a second data set and based at least in part on the lookup table of the external embeddings data structure, a second embeddings set by appending, for each (1) second code of the second data structure or (2) second portion of the second data structure and to the second data structure, a corresponding embedding of the one or more second corresponding embeddings in the lookup table for the second code of the second data structure or the second portion of the second data structure;

generating a plurality of first row representations for the first embeddings set by aggregating the one or more first corresponding embeddings in the first embeddings set such that each row in the first data structure is aggregated into a first single row representation;

generating a plurality of second row representations for the second embeddings set by aggregating the one or more second corresponding embeddings in the second embeddings set such that each row in the second data structure is aggregated into a second single row representation;

generating a first column representation for the first embeddings set by aggregating the plurality of first row representations;

generating a second column representation for the second embeddings set by aggregating the plurality of second row representations;

generating a similarity metric based on the first column representation and the second column representation;

based on the similarity metric, generating a similarity indication element associated with the first data structure and the second data structure; and providing the similarity indication element associated with the first data structure and the second data structure while restricting access to raw data contained in the first data structure and the second data structure.

18. The one or more non-transitory computer-readable storage media of claim 17, wherein the operations further comprise:

receiving the first data structure from a first data source; and receiving the second data structure from a second data source.

19. The one or more non-transitory computer-readable storage media of claim 17, wherein the first data structure comprises a first plurality of first records arranged according to a first matrix and the second data structure comprises a second plurality of second records arranged according to a second matrix.

20. The one or more non-transitory computer-readable storage media of claim 19, wherein the first data structure is associated with a first unknown schema and wherein the second data structure is associated with a second unknown schema.

* * * * *